United States Patent
Han

(10) Patent No.: US 9,371,775 B2
(45) Date of Patent: Jun. 21, 2016

(54) ONE-STROKE INTERNAL COMBUSTION ENGINE

(71) Applicant: Differential Dynamics Corporation, Owings Mills, MD (US)

(72) Inventor: Kyung Soo Han, Timonium, MD (US)

(73) Assignee: Differential Dynamics Corporation, Owings Mills, MD (US)

( * ) Notice: Subject to any disclaimer, the term of this patent is extended or adjusted under 35 U.S.C. 154(b) by 0 days.

(21) Appl. No.: 14/860,962

(22) Filed: Sep. 22, 2015

(65) Prior Publication Data

US 2016/0025001 A1    Jan. 28, 2016

Related U.S. Application Data

(63) Continuation-in-part of application No. 14/225,658, filed on Mar. 26, 2014, now Pat. No. 9,169,772.

(60) Provisional application No. 61/805,584, filed on Mar. 27, 2013, provisional application No. 61/825,560, filed on May 21, 2013.

(51) Int. Cl.
*F02B 53/00* (2006.01)
*F02B 75/02* (2006.01)
(Continued)

(52) U.S. Cl.
CPC .............. *F02B 75/02* (2013.01); *F02B 53/12* (2013.01); *F02B 55/02* (2013.01); *F02B 75/24* (2013.01); *F02B 75/282* (2013.01); *F02B 75/287* (2013.01); *F02B 2075/023* (2013.01); *G06Q 30/02* (2013.01); *G06Q 30/0269* (2013.01); *G06Q 30/0274* (2013.01); *G06Q 50/01* (2013.01)

(58) Field of Classification Search
CPC ........ F02B 75/02; F02B 53/12; F02B 75/287; F02B 75/24; F02B 55/02; F02B 75/282; F02B 2075/023; F01B 3/0079; F01C 9/002
USPC ...................................... 123/45 R, 245, 241
See application file for complete search history.

(56) References Cited

U.S. PATENT DOCUMENTS

| 725,087 | A | * | 4/1903 | Jenney | ..................... F01C 9/002 |
| | | | | | 123/18 R |
| 967,097 | A | * | 8/1910 | Woodward | .............. F02B 53/00 |
| | | | | | 123/18 A |

(Continued)

*Primary Examiner* — Thai Ba Trieu
*Assistant Examiner* — Jason T Newton
(74) *Attorney, Agent, or Firm* — Cameron LLP

(57) ABSTRACT

One-stroke internal combustion engines may comprise reciprocating pistons which are either straight or rotary. Three principles are required to make one-stroke engines work: create four dedicated chambers, assign the chambers with coordinated functions, and make pistons move in unison. The functions will be assigned only to a single stroke but an Otto cycle produces a repeating four stroke cycle. Since four functions are performed simultaneously during one stroke, every stroke becomes a power stroke. In reality, 1-stroke engines are physically rearranged 4-stroke engines. Both straight and rotary 1-stroke engines can be modified to comprise opposed piston opposed cylinder (OPOC) engines. The reciprocating piston output of 1-stroke pistons may be converted to continuously rotating output by using crankshafts with split bushings or newly developed Crankgears with conventional bearings. A 1-stroke engine may require only one crankshaft and thus may reduce the number of parts and increase the specific power ratio. Outputs of two 1-stroke engines may be combined using a spur/helical gear assembly to increase power output.

9 Claims, 17 Drawing Sheets

(51) Int. Cl.
*F02B 53/12* (2006.01)
*F02B 75/28* (2006.01)
*F02B 75/24* (2006.01)
*F02B 55/02* (2006.01)
*G06Q 30/02* (2012.01)
*G06Q 50/00* (2012.01)

(56) References Cited

U.S. PATENT DOCUMENTS

| | | | | |
|---|---|---|---|---|
| 1,234,599 A * | 7/1917 | Allen | | F02B 53/00 123/245 |
| 1,346,805 A * | 7/1920 | Barber | | F01C 9/002 123/18 R |
| 1,490,820 A * | 4/1924 | Gross | | F02B 53/00 123/18 R |
| 3,397,680 A * | 8/1968 | Guin | | F02B 53/00 123/245 |
| 3,798,897 A * | 3/1974 | Nutku | | F01C 1/077 123/245 |
| 3,909,162 A * | 9/1975 | Nutku | | F01C 21/18 123/245 |
| 4,099,448 A * | 7/1978 | Young | | F01C 9/00 123/18 R |
| 4,169,697 A * | 10/1979 | Doundoulakis | | F01C 1/07 418/34 |
| 4,257,752 A * | 3/1981 | Fogarty | | F01C 1/07 417/481 |
| 4,599,976 A * | 7/1986 | Meuret | | F01C 9/002 123/18 R |
| 4,687,427 A * | 8/1987 | Seybold | | F01C 1/077 418/34 |
| 5,289,802 A * | 3/1994 | Paquette | | F01B 7/14 123/18 A |
| 5,501,070 A * | 3/1996 | Lin | | F02B 53/02 418/34 |
| 6,036,461 A * | 3/2000 | Bahniuk | | F01C 1/073 123/245 |
| 6,113,370 A * | 9/2000 | Volftsun | | F01C 1/067 123/245 |
| 7,222,601 B1 * | 5/2007 | Kamenov | | F01C 9/002 123/18 R |
| 8,297,253 B2 * | 10/2012 | Kurowski | | F01C 1/07 123/238 |
| 8,449,771 B2 * | 5/2013 | Giles | | B01D 61/06 210/321.66 |
| 2003/0121482 A1 * | 7/2003 | Macey | | F02B 53/00 123/18 R |
| 2005/0161016 A1 * | 7/2005 | Kamenov | | F01C 9/002 123/245 |
| 2006/0162548 A1 * | 7/2006 | Patterson | | F01C 9/002 92/121 |
| 2007/0125320 A1 * | 6/2007 | Smith | | F01C 9/002 123/18 R |
| 2008/0149067 A1 * | 6/2008 | Kimes | | B60K 6/12 123/245 |
| 2011/0132315 A1 * | 6/2011 | Kamenov | | F02B 53/04 123/212 |

* cited by examiner

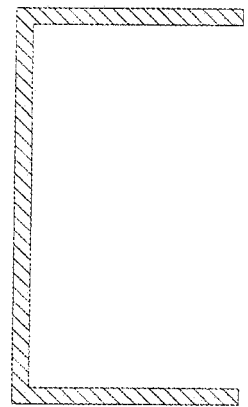
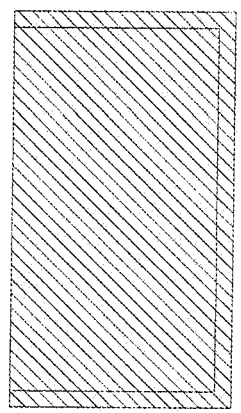
Figure 10B
Figure 10C
Figure 10D
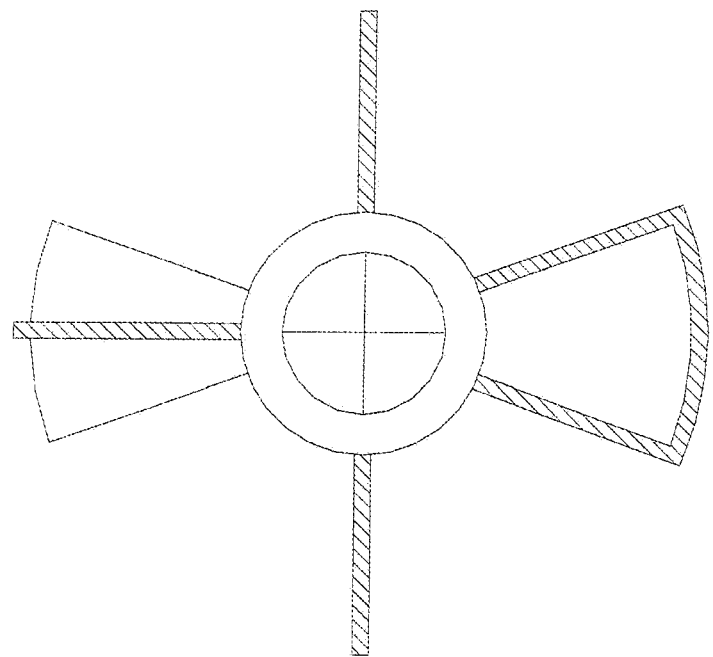
Figure 10A

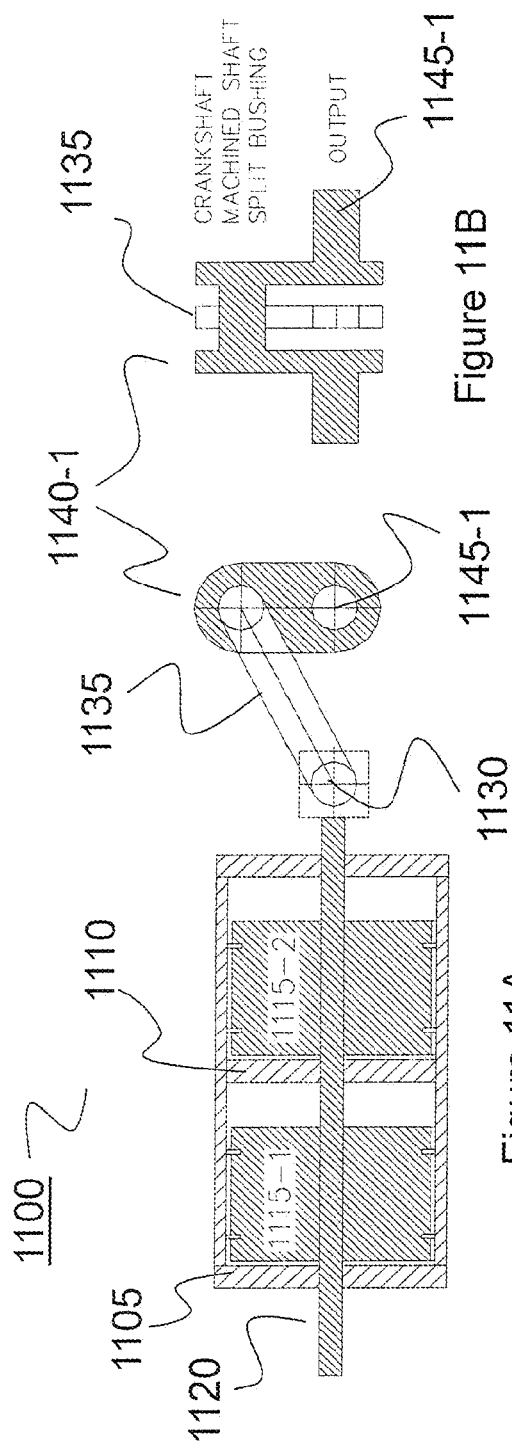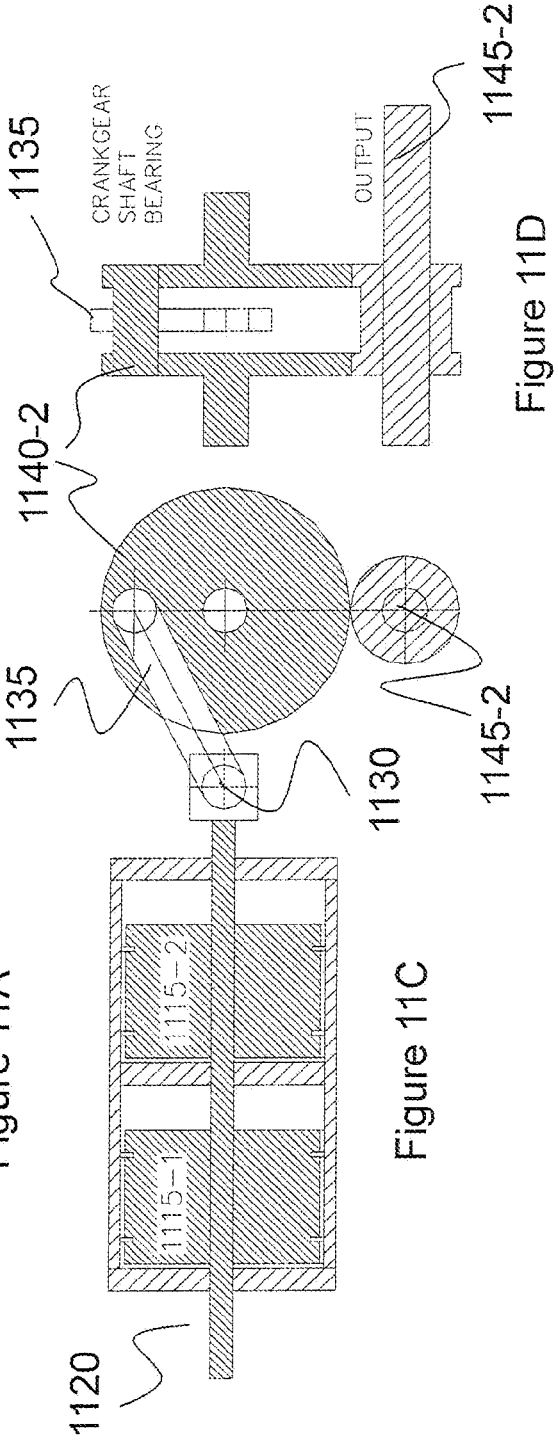

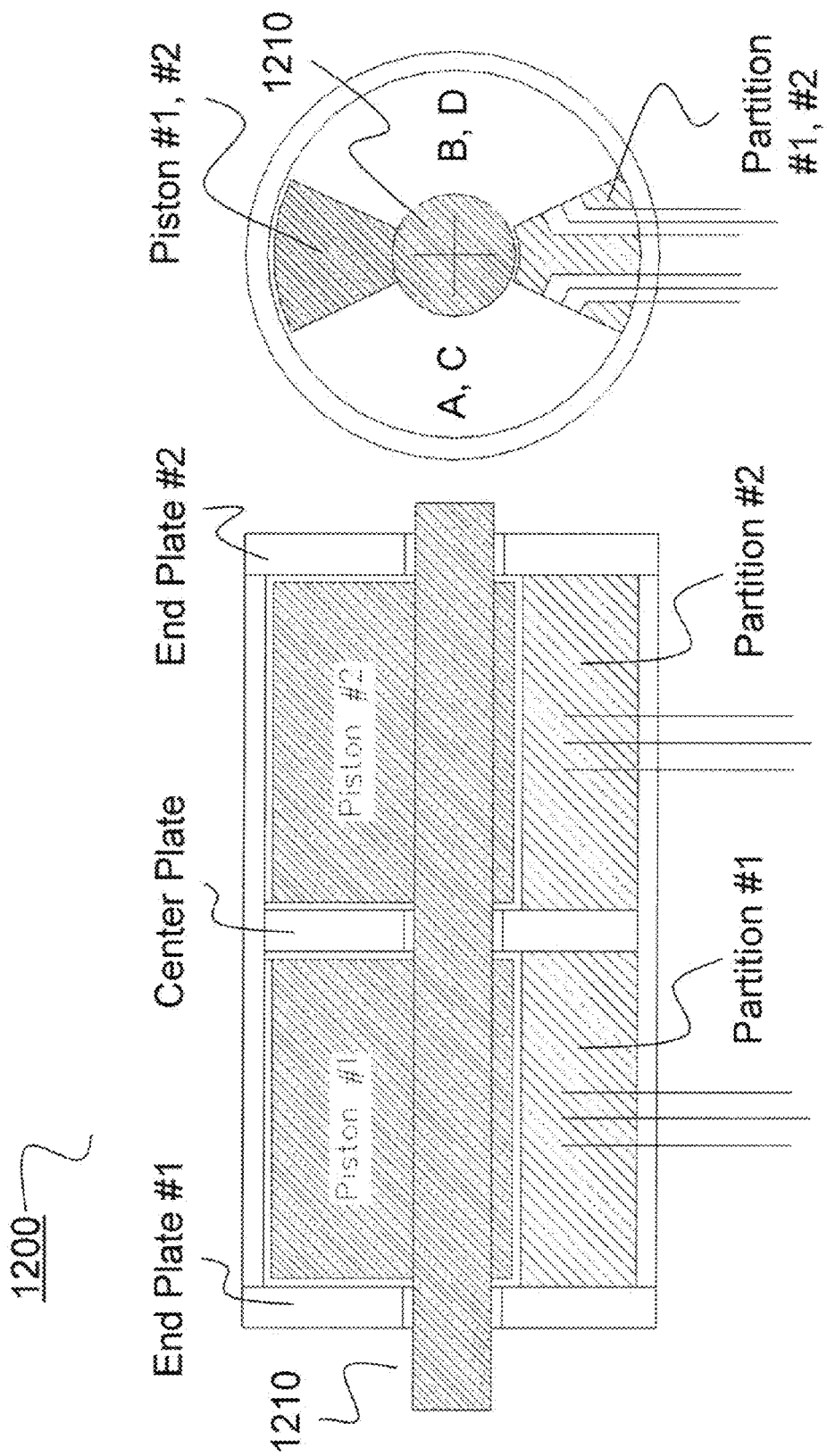
Figure 12A: Front View
Figure 12B: Side View

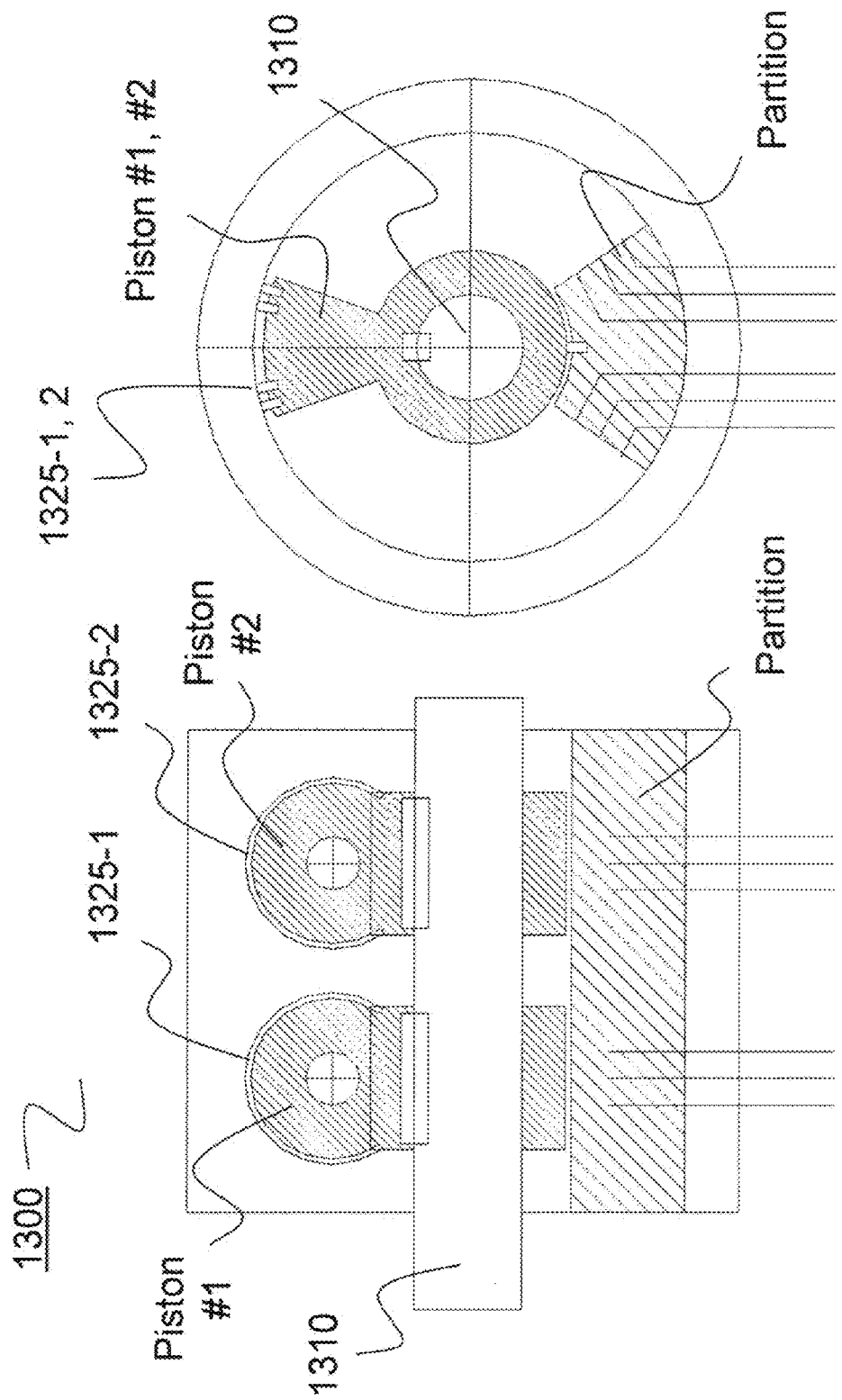

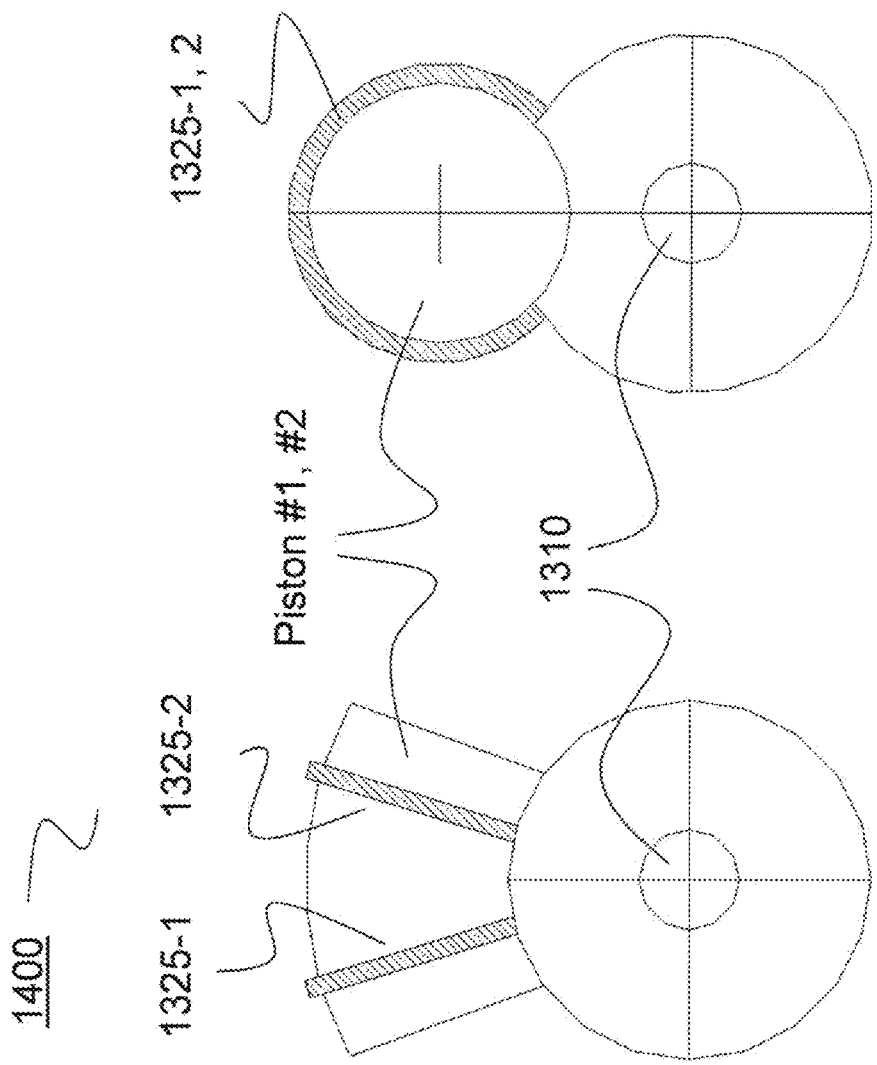

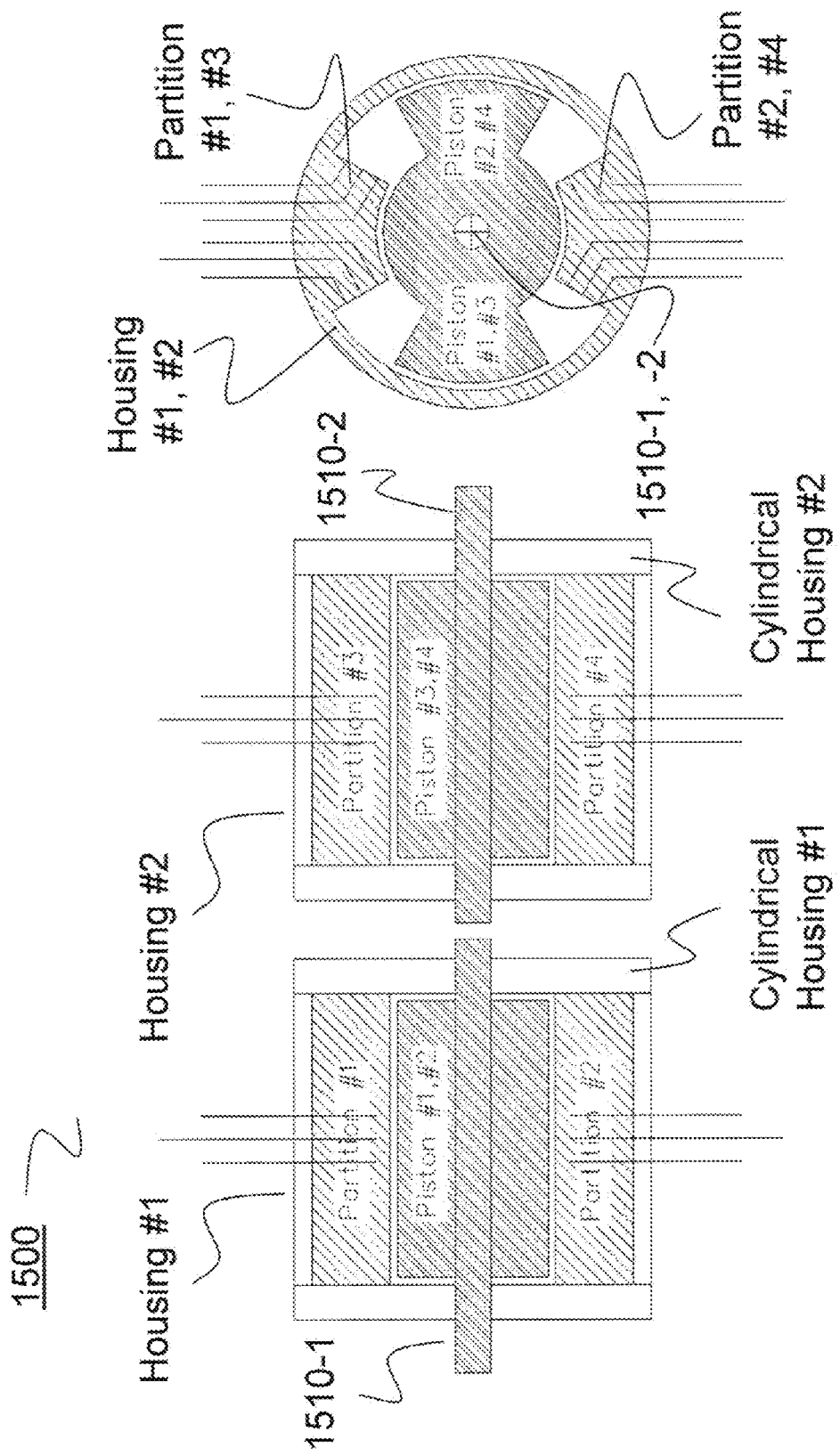

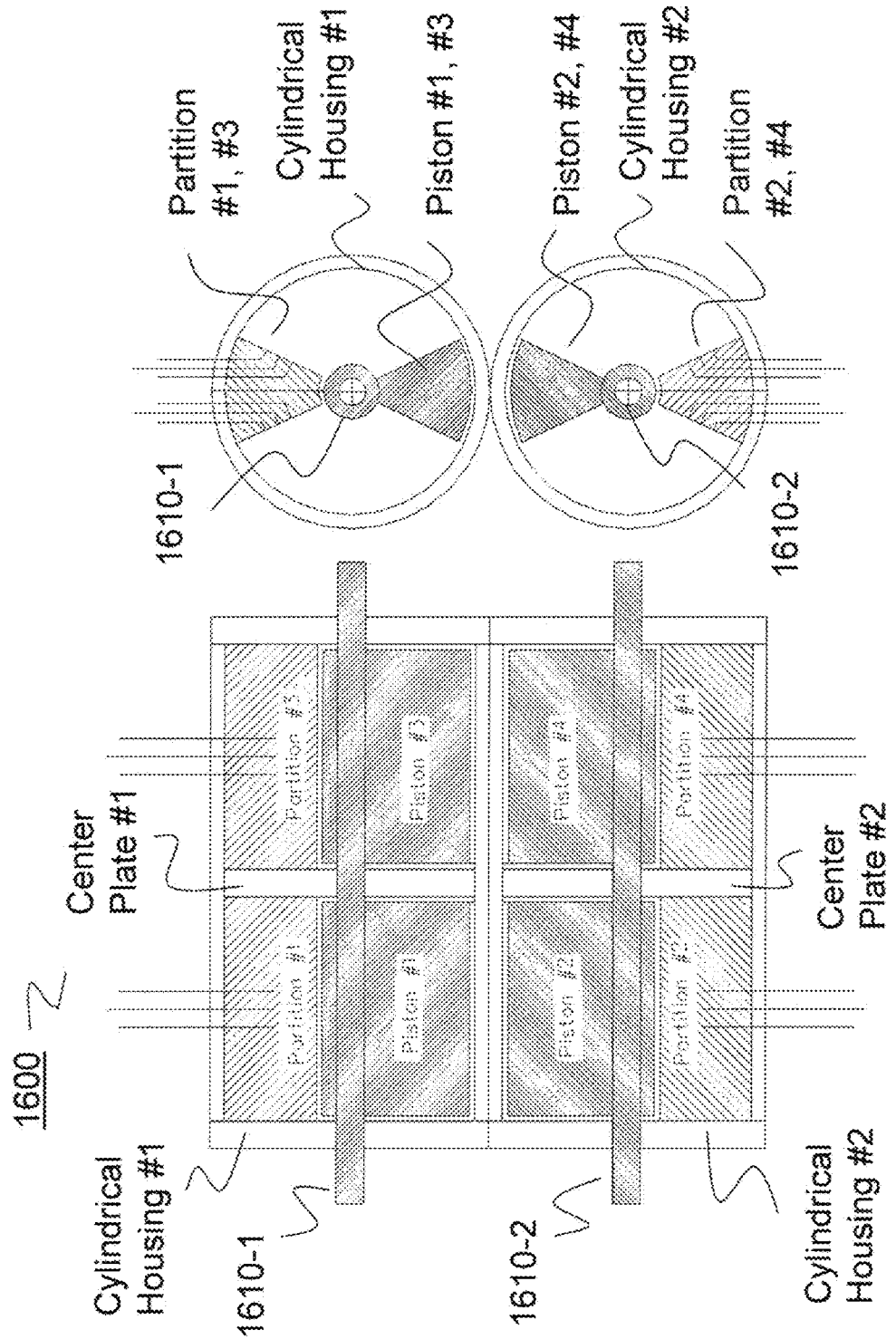

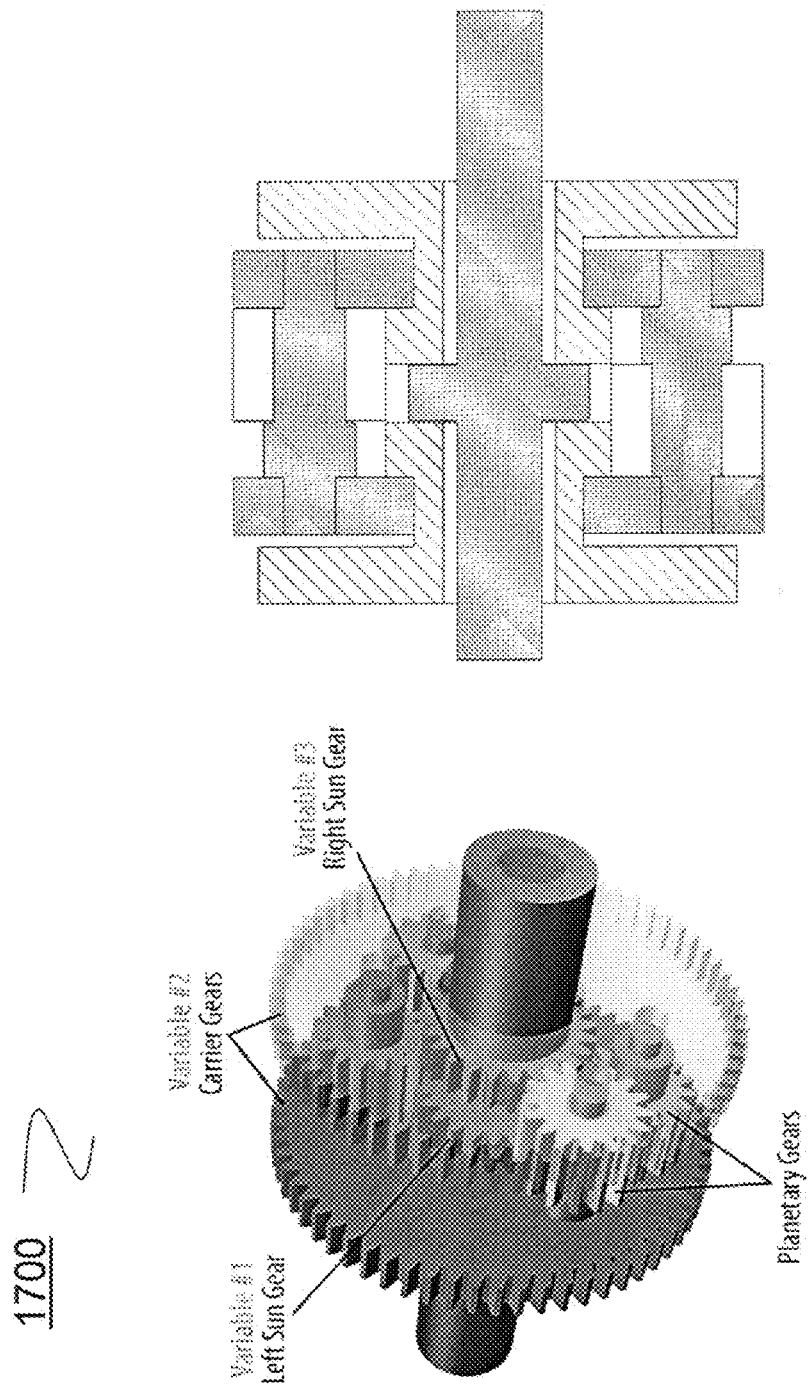
Figure 17B: Side View
Figure 17A: Perspective View

ONE-STROKE INTERNAL COMBUSTION ENGINE

This application is a continuation-in-part of U.S. patent application Ser. No. 14/225,658 filed Mar. 26, 2014 (now allowed) of Kyung Soo Han which claims the benefit of priority to U.S. Provisional Patent Application Ser. No. 61/805,584 filed Mar. 27, 2013 entitled "Reciprocating Rotary or Linear Engines with Dedicated Chambers for Intake and Exhaust" and 61/825,560 filed May 21, 2013 entitled "Reciprocating Rotary or Straight/Linear Engines with Dedicated Chambers for Intake, Compression, Ignition/Combustion, and Exhaust" by Kyung Soo Han, the contents of each of which are incorporated by reference as to their entire contents.

TECHNICAL FIELD

The technical field of the invention relates to providing an efficient internal combustion engine being a one-stroke internal combustion engine having a coordinated cycle making every stroke a power stroke and, more particularly, to an efficient and more powerful engine having a reciprocating piston stroke, dedicated intake, compression, ignite/combustion and exhaust chambers which share the coordinated one-stroke engine cycle, improved scavenging, simple sequential cycling and comprising either a straight/linear, rotary or opposed piston configuration, straight/linear or rotary and further using a spur/helical gear assembly to combine engine outputs to provide greater output power.

BACKGROUND

The well-known Wankel rotary engine (with Otto cycle) is attributed to Felix Wankel. A shaft is located at the middle of an oblong chamber of the Wankel rotary engine having INTAKE and EXHAUST ports. A triangular rotary piston is caused, via gearing, to rotate a further shaft through INTAKE, COMPRESSION, IGNITION and EXHAUST, an Otto cycle. Two spark plugs are located at the right of the oblong chamber. It may be understood that when the triangular rotary piston is causing contents of a chamber formed proximate the spark plugs to be compressed, ignition will cause combustion and the rotary piston will rotate the output shaft.

It is generally known in the art to provide two-stroke engines. A two-stroke engine may be defined as an engine having a power stroke per a revolution of an associated crankshaft of 360° and with two strokes, or, for example, upward or downward movements (upstroke/downstroke). U.S. Pat. No. 8,127,544 issued Mar. 6, 2012 to Schwiesow et al. (Schwiesow) describes the history of so-called "double acting" two-stroke engines from U.S. Pat. No. 1,785,643 to W. G. Noack el al. issued Dec. 16, 1930, to U.S. Pat. No. 7,258,086 to Fitzgerald issued Aug. 21, 2007. In Schwiesow, the following so-called "double-acting" systems are described: those of U.S. Pat. No. 2,963,008 to Waldrop, U.S. Pat. No. 4,205,528 of Grow, U.S. Pat. No. 6,199,519 to Van Blarigan, U.S. Pat. No. 6,700,229 to Sadarangani et al. and U.S. Pat. No. 7,258,86 to Fitzgerald. As early as Noack et al. '643, circa 1930, FIG. 1 shows pistons 6 and 7, and FIG. 2, shows additional compressor pistons 11 and 12 having a back and forth movement within "free piston engine" 1. Waldrop '008 shows an improvement to a free piston engine including a fuel injection system. Grow '528 adds scavenging via a "fan scavenged two-stroke cycle."

An alleged improvement introduced by Schwiesow to these earlier "double-acting" two-stroke systems is a homogenous charge compression ignition (HCCI) for "essentially constant volume combustion." Schwiesow depicts an embodiment in each of the '544 patent's FIGS. 8-10 wherein first and second pistons are fixedly attached to each other via a rigid connecting rod so as to oscillate in a cylindrical case from one end to the other of the cylindrical case when cycled sparked ignition of each fuel/air chamber at each end of the cylindrical case occurs.

U.S. Pat. No. 6,170,443 to Hofbauer describes a supercharged opposed piston, opposed cylinder (OPOC) internal combustion engine. A crankshaft rotational axis is shown driven by pushrods and pullrods connected to eccentrics. These comprise many driving arms which make the internal operation appear similar to that of a train locomotive. The OPOC engine of the '443 patent employs a conventional exhaust system. However, U.S. Pat. No. 8,490,380, issued Jul. 23, 2013, also to Hofbauer, describes an improved OPOC system having an incoming air chamber and an exhaust chamber in communication with a combustion chamber with improved scavenging.

Also known is the so-called Bourke internal combustion engine named for its inventor, Russell Bourke. The Bourke engine is described in GB514842, accepted Nov. 20, 1939. Bourke shows in his GB '842 patent, FIGS. 1-4, oppositely disposed cylinders 20 with pistons therein driving connecting rods 19 and a rotatably mounted crank shaft. "The invention consists in driving gear for internal combustion engines having opposed cylinders, pistons and piston rods, a crank shaft and transmission means for converting the reciprocating rods of the pistons into rotary motion of the crank shaft which transmission means comprises a bearing member encircling the crank, pin and means connected to the pistons and engaging against opposite sides of said bearing member characterized in that said means engaging against the bearing member are formed as a pair of separate bearing blocks rigidly mounted on plate like means acting to connect said blocks together." Bourke suggests that "each of the bearings 3, 6, 10 and 15 are preferably made up of inner and outer circular spaced races between which are a number of steel balls."

An example of a so-called one-stroke internal combustion engine is Macey, U.S. Published Patent Application No. 2003/0121482, abandoned. A piston block 20 defines a combustion cavity and a compression cavity. A "working assembly 40" is rotatably disposed in the block 20 including a cylindrical portion 46, a compression paddle 50 and a piston 48. There further is depicted an arcuate combustion cavity 28 and an arcuate compression cavity 30. A drive rod 90 operably interconnects the first and second piston blocks 20 for common driving of the components of the drive block 22.

In Japan, Mr. Sadami Wakui prepared was issued JP 59-226231 on Dec. 19, 1984. According to an English language translation of his patent application, he believed himself to be the inventor or two concepts: 1) An internal combustion engine, wherein a plurality of combustion chambers are arranged in series and a piston in each combustion chamber is dynamically connected to one crank and 2) an internal combustion engine, wherein combustion chambers are arranged on both sides of one piston and the combustion chambers of both sides are connected in series via one piston. The first concept is seen in FIG. 1 showing, according to the translation, an "Internal combustion engine wherein two combustion chambers are arranged in series." The second concept is seen in FIG. 2 which shows "Internal combustion engine wherein combustion chambers are disposed on both sides of a piston." As the patent develops, FIG. 4 shows the combination of FIGS. 1 and 2 such that two pistons are connected by a rod through two chambers performing four functions: suction, compression, explosion and exhaust, where the rod also is designed to extend from the two chambers and turn an output shaft. The figure shows four spark plugs and four valves in each of the four chambers having the two connected pistons. The Wakui engine may be called a straight-line engine as the rod extends linearly through the four chambers formed by the two pistons separated by a wall in a linear housing; (the Wakui engine is not a rotary engine).

Even with the above-described improvements to two-stroke internal combustion engines, other conventional engines and the Wakui engine, there still remains a need in the art to provide further enhancements and improvements to, for example, fuel efficiency and increased power at the improved fuel efficiency and further improved scavenging by means of further embodiments of rotary and straight-line reciprocating internal combustion engines having a coordinated cycle and one-stroke, for example, a 180° power stroke.

SUMMARY OF THE SEVERAL EMBODIMENTS

This summary is provided to introduce a selection of concepts. These concepts are further described below in the Detailed Description. This summary is not intended to identify key features or essential features of the claimed subject matter, nor is this summary intended as an aid in determining the scope of the claimed subject matter. These concepts relate to a coordinated one-stroke internal combustion engine with a reciprocating piston as will be further described herein and also may be referred to as a 1-Stroke™ engine. By one-stroke (or 1-stroke) is meant herein the movement caused by ignition of a spark plug associated with a piston causing the piston to move from zero speed, start, to move up to maximum speed and then, down to zero speed or stop, for example, in one direction. In a one-stroke piston engine, straight or rotary embodiment as will be explained herein, every stroke is a power stroke.

A 1-stroke engine only requires one power stroke or one 1-stroke piston assembly in order to rotate the output shaft continuously or complete a full cycle. So the number of power strokes required to complete a full cycle is one significant difference between the present engine and a conventional engine. The power stroke per piston is the same 180° power stroke. The number of piston assemblies may decrease from conventional 4-stroke to 2-stroke to an embodiment of a 1-stroke engine of the present invention from 4 to 2 to 1 as does the number of crankshafts.

The currently used 4-stroke piston engine typically has four or more pistons and up to approximately five hundred parts. The 2-stroke engine may have half as many parts, and the present DDMotion engine(s) shown in the allowed priority patent application as this continuation-in-part thereof approximately 200 parts. As explained above, the conventional 4-stroke piston has four dedicated chambers during a piston cycle. The 1-stroke embodiment of the present invention also has four dedicated chambers, but the 2-stroke engine has one dedicated chamber. The 4-stroke engine has high fuel efficiency as does the 1-stroke embodiment of the present invention while a conventional 2-stroke engine has low fuel efficiency. The 4-stroke and 1-Stroke DDMotion engines have low emissions while the 2-stroke engine has a comparably high degree of emissions. The specific power ratio of a currently used 4-stroke engine is 1.0 because this conventional engine is selected as a reference. The conventional 2-stroke engine and the DDMotion 1-Stroke engine may have specific power ratios of approximately 1.5 and greater than 1.5 respectively. The conventional 4-stroke engine is typically used to power vehicles such as automobiles (cars). The currently used 2-stroke engine is used in small engines and power vehicles. The 1-Stroke DDMotion engine may be used in cars, as small engines and in power vehicles, even in power tractors and ships with multiple propellers.

An embodiment of the present coordinated 1-stroke internal combustion engine invention will be described herein in two forms, a straight line and a rotary. The straight-line, by definition, has at least two pistons in order to form a straight line. The rotary version may have two or more pistons in order to form a circular line. Otherwise, the present internal combustion engine embodiments exhibit only about two hundred parts, have dedicated chambers and so exhibit high fuel efficiency and low emission. Their power stroke/piston may rotate the output shaft one hundred eighty degrees. Its specific power ratio may be increased over known engines to greater than 1.5. Its uses are practically unlimited: for example, vehicles (such as trucks or cars), snowmobiles, lawnmowers, motorcycles, locomotives and even to power large ships with multiple propellers. As described herein, outputs of simple 1-stroke engines may be combined to increase output power using, for example, a spur/helical gear assembly as taught in co-pending U.S. patent application Ser. No. 14/668,315 filed Mar. 25, 2015 of Kyung Soo Han showing a plurality of Transgear™ gear assemblies which all may be used to combine two outputs into one, more powerful output.

Sprags (one-way rotational ratchet bearings, as will be further described below and are shown and described in U.S. Pat. No. 8,485,933 issued Jul. 16, 2013 and U.S. Pat. No. 8,641,570, incorporated by reference as to their entire contents) and gears, driver and gears or crankshaft control may be provided in a 1-Stroke DDMotion engine so that an output shaft continuously rotates in a desired rotational direction (clock-wise rotation or counter clock-wise rotation). A 180° power stroke cycle will be described and depicted from initial start (starting) through a full, repeating cycle whereby intake and exhaust chambers one through four of the four chambers are each filled with an air/fuel mixture, ignited and exhausted in such a manner that power is produced at great fuel economy. A simple engine may be crankgear, crankshaft controlled, gear and Sprag controlled (Sprag, herein, will be denoted with a capital "S" to generally indicate a one-way clutch or ratchet bearing as defined further below or per U.S. Pat. No. 8,641,570 or its equivalent to provide unidirectional output from two rotational direction input) or otherwise controlled.

The control technology as described herein as used in an embodiment of a DDMotion 1-Stroke or multiple stroke or opposed piston engine may be referred to as a ratchet bearing or a one-way clutch bearing Introduced above as a Sprag. A Sprag is a trade name for such a bearing and is commercially available, for example, from Renold plc of the United Kingdom and from NMTG of India. Sprag may be used herein as a short-hand for such a bearing and assembly which is freewheeling in one direction of rotation and engaged in the other rotation direction or its equivalent and may be referred to herein generally as an integral part of output gears, for example, when discussing a Sprag application in one or more embodiments of an internal combustion engine with a 180° power stroke—rotary or linear/straight-line or opposed piston.

An external housing of such a ratchet or one-way clutch bearing (or Sprag) has a notch for receiving, for example, a needle roller such that when an internal race is moving in one rotational direction, the outer housing may move in either direction and be free-wheeling (or vice versa, if the outer housing rotates, the inner race may move) because the needle roller is loose or free-wheeling and located at one end of its associated notch. On the other hand, when the internal race rotates in the other rotational direction with respect to the outer housing or vice versa, the needle roller rolls into an engaged position between the race and the notch such that the housing is controlled to rotate in this other rotational direction with the race. A Sprag is also further described and shown in FIG. 4C of U.S. Pat. No. 8,388,481 issued Mar. 5, 2013 (hereinafter, the '481 patent) and incorporated by reference as to its entire contents.

Further features of the present embodiments include an output shaft rotation of 180° compared with, for example, two-stroke, rotary 360° and four-stroke 720° (FIG. 12 of the '481 patent). Also, described herein will be a simple sequenced cycle of a rotary engine where control may be provided via a rotary switch or electronic controls. The cycle may be remotely controlled with solenoids, for example, and may be designed in a rotary embodiment or a straight/linear embodiment. Output control, as suggested above may be via Sprags and employ a crankshaft, a rotary output, a driver and other gears for clockwise or counter-clockwise output shaft rotation. An opposed piston design will also be described, both straight-line and rotary.

As used herein, a "cycle" is defined as that activity by a 1-stroke engine in which first and second pistons form within, either a rotary or a straight-line engine, four chambers in which four "functions" are performed to complete a power stroke. The four functions performed within the four chambers dedicated and assignable to the four functions include ignite, exhaust, intake and compress. Each cycle is a power stroke because the first and second pistons deliver power to an output shaft causing reciprocating motion of the shaft because the four dedicated chambers of the two pistons are sequentially dedicated to all four functions. The cycles can be in a selected sequence of four cycles to comprise an Otto cycle according to FIGS. 4-7 as will be further explained herein.

These several technologies will be further described with reference to particular applications in automobiles, other vehicles and internal combustion engines generally having dedicated intake, compression, ignition/combustion and exhaust chambers in, for example, a 180° power 1-Stroke DDMotion engine. The several technologies are depicted in the drawings, a brief description of which follows.

BRIEF DESCRIPTION OF THE DRAWINGS

The features and advantages of the present invention will become more apparent from the detailed description set forth below when taken in conjunction with the drawings in which like reference numbers may indicate identical or functionally similar elements, FIG. 1A to FIG. 1D provide a series of mechanical diagrams explaining a theory of how a conventional 4-stroke (4 piston) engine may be compared and differences indicated in a series of steps of conversion from the conventional 4-Stroke engine of FIG. 1A to a DDMotion 1-Stroke engine FIG. 1D whereby

FIG. 4 shows, in Cycle #1, chamber A is assigned Ignite while chamber B is assigned Compress. Chamber C is assigned Intake and chamber D is assigned Exhaust. Pistons #1 and #2 have moved to the left. In a rotary embodiment, the pistons have moved, for example, in a counter-clockwise direction. In Cycle #2, chamber A is assigned Exhaust while chamber B is assigned Ignite. Chamber C is assigned Compress while chamber D is assigned Intake. Pistons #1 and #2 have moved to the right. In a rotary embodiment, the pistons have moved, for example, in a clockwise direction. In Cycle #3, chamber A is assigned Intake while Chamber B is assigned Exhaust, Chamber C is assigned Ignite while Chamber D is assigned Compress. In Cycle #4, chamber A is assigned Compress while chamber B is assigned Intake. Chamber C is assigned Exhaust while Chamber D is assigned Ignite. Once the coordinated functions are assigned to each chamber in Cycle #1, each chamber follows Otto cycle. In Chamber A, for example, Ignition in Cycle #1 becomes Exhaust in Cycle #2, Intake in Cycle #3, and Compress in Cycle #4. Each function is assigned to a chamber following an Otto cycle and all the cycles repeat in each of FIGS. 4-7.

FIG. 5 shows a further combination of assignment of coordinated functions to chambers where the functions assigned to chambers #1 and #2 and their respective functions assigned to chambers #3 and #4 have reversed positions in a straight 1-stroke engine. Only referring to Cycle #1, by way of example, Chamber A is assigned Intake while Chamber B is assigned Exhaust, Chamber C is assigned Ignition while Chamber D is assigned Compress.

FIG. 6 shows a further combination of coordinated assignment of functions to chambers. Only referring to Cycle #1, by way of example, Pistons #1 and #2 have moved to the left. Chamber A is assigned Ignite while chamber B of the housing for Piston #1 is assigned Exhaust. Chamber C of the housing for Piston #2 is assigned Intake while chamber D is assigned Compress and so on.

FIG. 7 shows a further combination of coordinated assignment of functions to chambers. Only referring to Cycle #1, by way of example, Chamber A of the housing for Piston #1 is assigned Intake while Chamber B is assigned Compress, Chamber C is assigned Ignite while Chamber D of the housing for Piston #2 is assigned Exhaust and so on.

FIG. 9 shows a mechanical diagram of an embodiment of a DDMotion rotary piston opposed piston, opposed cylinder (OPOC) engine having a DDMotion 1-Stroke piston wherein the embodiment comprises four pistons, pistons #3 and #4 being integral with or attached to an internal cylindrical housing of an external cylindrical housing and pistons #1 and #2 are joined by a cylindrical center portion and central crankshaft forming four dedicated chambers A, B, C and D. Chambers A, B, C and D may be assigned coordinated functions as introduced by FIGS. 4-7 and wherein conventional intake, exhaust, valves and spark plugs may be installed to end plates of the external cylindrical housing (not shown).

FIG. 10A, FIG. 10B, FIG. 10C and FIG. 10D show exemplary embodiments for rotary double piston seals wherein FIG. 10A in top view shows a rotary 1-stroke piston embodiment with seal plates along a diameter and a C-shaped seal and a piston-shaped seal installed along a perpendicular diameter in a rotary 1-stroke engine of the present invention; FIG. 10B in side view shows details of the C-shaped seal of the rotary engine of FIG. 10A; FIG. 10C in side view shows details of a plate seal of FIG. 10A; and FIG. 10D in side view shows piston-shaped seal of the rotary engine of FIG. 10A for installation on an internal diameter.

FIG. 11A through FIG. 11D show alternate means of coupling a 1-stroke, central common shaft, two double-headed cylinder embodiment of the present invention, wherein FIG. 11A and FIG. 11B show a front view and an side view of a crankshaft machined shaft split bushing embodiment respectively for coupling a 1-stroke engine to produce an output 1145-1 and FIG. 11C and FIG. 11D show a front view and an overhead view of a Crankgear shaft bearing embodiment respectively for coupling a 1-stroke engine to produce an output 1145-2.

FIG. 12A and FIG. 12B provide an introduction to the concept, for example, of combining first and second 1-stroke, single piston radially reciprocating rotary engines to form a single engine (similar to that shown in FIGS. 2 and 3) for reciprocating motion of shaft 1210, wherein FIG. 12A shows a front view of first and second rotary single piston engines side by side in a housing, each engine forming two dedicated chambers, for example, A and B or C and D having a single piston and a single partition for forming four chambers, A, B, C and D between the two single piston rotary engines mounted within the housing for turning shaft 1210, noting that the stroke of pistons #1 and #2 comprise angles in excess of 180°, for example, between 270° and 320° wherein the Piston #1 and #2, for example, each comprise preferably equal angles between 20° and 50° as seen in side view FIG. 12B. Partitions #1 and #2 are mounted back to back in FIG. 12B and shown side-by-side in FIG. 12A.

FIGS. 13A and 13B show a further embodiment of two pistons mounted side by side similar to the combined engine of FIGS. 12A and 12B; Front View FIG. 13A shows Piston #1 and #2 surrounding reciprocating shaft 1310 and a single partition shown lengthwise in FIG. 13A having different sets of leads for sparking either side of the partition as seen better in side view FIG. 13B. As in FIGS. 12A and 12B, the piston size has approximately the same angle range and the range of motion of the piston is in an equally large range greater than 180°. Round piston rings may be used in these assemblies if the pistons are toroidal.

FIGS. 14A and 14B show further embodiments for the engine of FIGS. 13A and 13B showing piston seals and rings wherein FIG. 14A in front view shows one or two piston rings 1325-1 and 1325-2 and FIG. 14B in side view shows Piston #1 and #2 having piston seals 1325-1 and 1325-2 extending the entire approximately 300° circumference of each piston. Round piston rings may be used in these assemblies if the pistons are toroidal.

FIG. 15A in front view and FIG. 15B in side view show two rotary engines side-by-side as seen in FIG. 15A comprising two assemblies as first shown in FIGS. 3A and 3B having first and second shaft outputs 1510-1 and 1510-2 whose assemblies' outputs may be combined together using a Transgear gear assembly to increase power output. Round piston rings may be used in these assemblies if the pistons are toroidal.

FIG. 16A in front view and FIG. 16B in side view show first and second assemblies similar to those shown in FIGS. 12A and 12B assembled together to provide first and second outputs at shafts 1610-1 and 1610-2 that may be combined by a Transgear gear assembly to increase power output. In this embodiment, first and second reciprocating outputs are provided at shafts 1610-1 and 1610-2 which are combined. Round piston rings may be used in these assemblies if the pistons are toroidal.

FIG. 17A in perspective view and FIG. 17B in side view show a typical spur/helical three variable Transgear gear assembly discussed in great detail in various embodiments but which may be used, for example, to combine first and second engine outputs, for example, as variables #1 and #3 to provide a combined, increased power output variable #2 where any of a left sun gear, right sun gear, and carrier gears comprise three assignable variables as first and second inputs and combined, increased power outputs.

These applications of variations and technologies of novel internal combustion engines with respect to various embodiments will be further described in the detailed description of the drawings which follows.

DETAILED DESCRIPTION

Figures 1A, 1B, 1C, 1D:
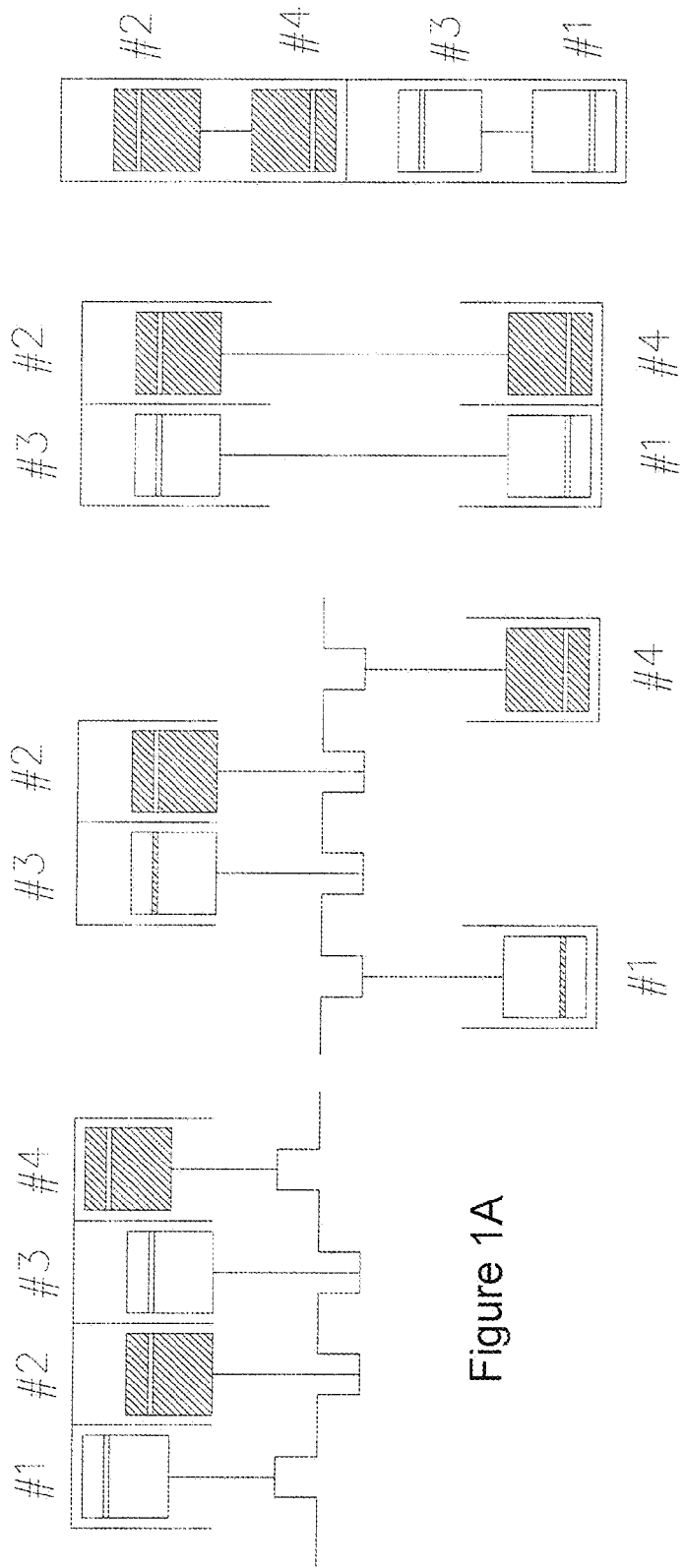
FIG. 1A shows a conventional 4-stroke internal combustion engine known in the art with pistons #2 and #3 expanded and #1 and #4 compressed, the chamber for piston #2 being filled with air/gas mixture (cross-hatched piston) and chamber #4 showing the air/gas mixture (cross-hatched piston) having been ignited and exhausted to the right while chamber #1 has air/gas mixture compressed and ready for ignition.
FIG. 1B shows a first step in realigning the typical 4-stroke engine moving pistons/chambers #1 and #4 (cross-hatched piston) to an opposite side of a crankshaft and piston/chambers #2 (cross-hatched piston) and #3 change locations in the engine of FIG. 1B.
FIG. 1C shows a step of aligning piston/chamber #1 and #3 and piston/chamber #2 and #4 (both cross-hatched pistons) so that a common shaft attaches each of the two pairs together for turning the crankshaft (not shown)
FIG. 1D shows aligning pistons/chambers #1 and #3 and pistons/chambers #2 and #4 (cross-hatched pistons) in a straight line to form an embodiment of a DDMotion 1-Stroke engine. As will be described herein the power outputs of the housing for pistons #2 and #4 (cross-hatched) may be combined with that of the housing for pistons #3 and #1 using a Transgear gear assembly.
Figure 2:
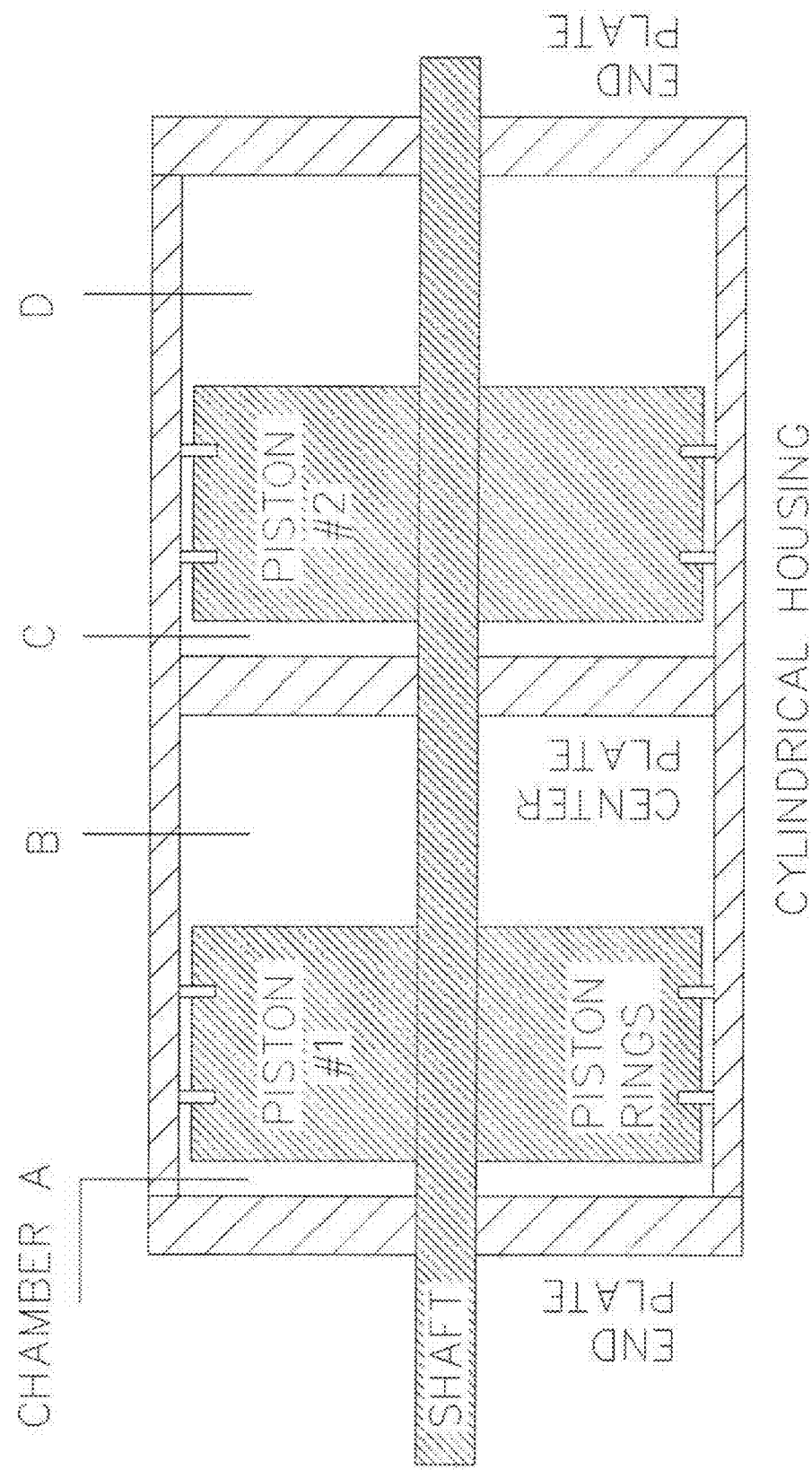
FIG. 2 shows a first embodiment of a straight/linear 1-Stroke DDMotion piston with four dedicated chambers A, B, C and D with two double-headed pistons joined/attached by a common central shaft; the shaft may turn a crankshaft and chambers may be dedicated to junctions, ignite, compression, exhaust and intake in four different combinations as will be discussed with reference to FIGS. 4-7; a center plate, first and second end plates create the four dedicated chambers A, B, C and D of a CYLINDRICAL HOUSING in which pistons #1 and #2 move together through an Otto cycle in each chamber and the SHAFT moves back and forth in a reciprocating motion to, for example, turn a crankshaft or a crankgear assembly. Intake, exhaust, spark plugs and valves for each chamber A, B, C and D are not shown.
Figure 3:
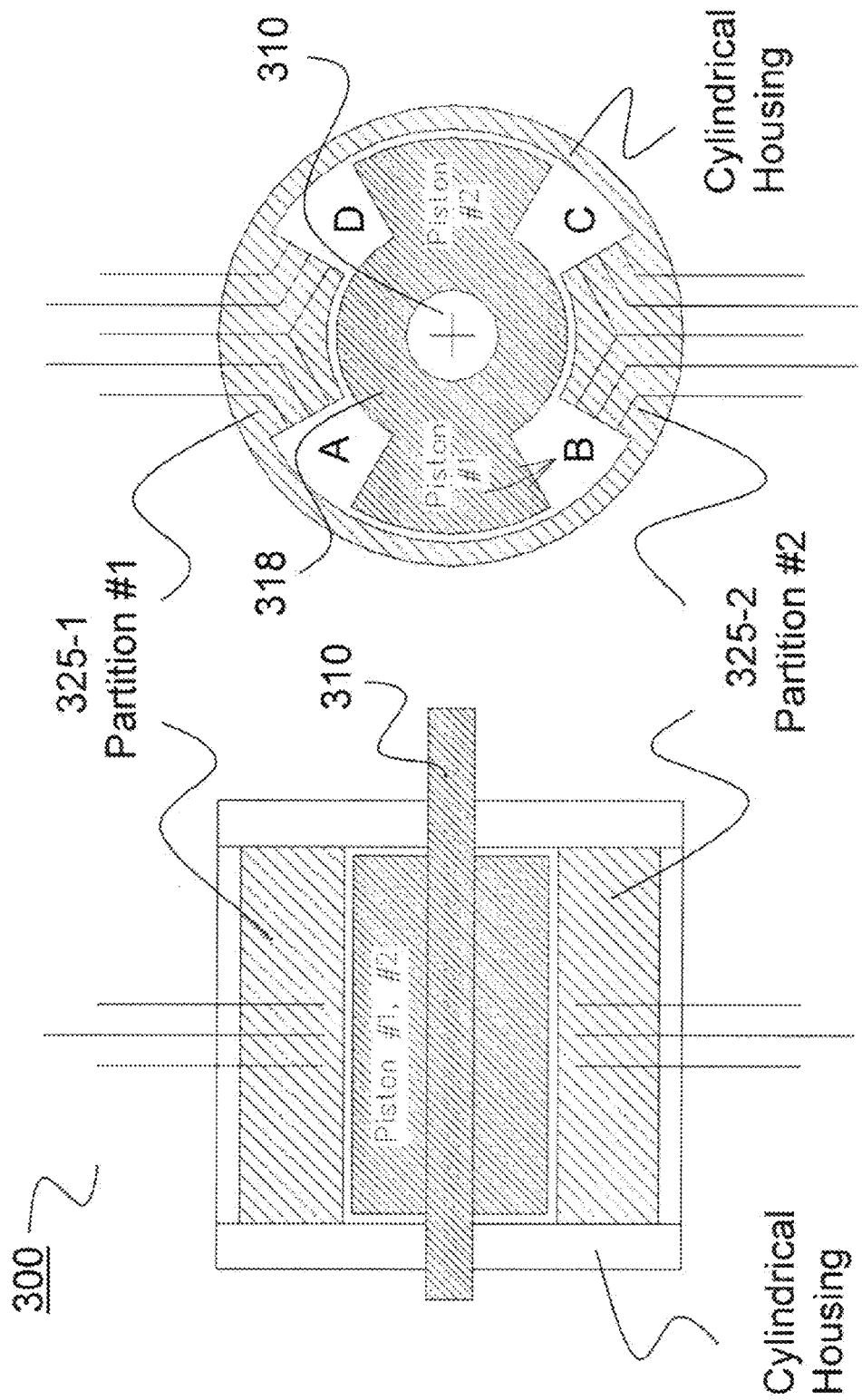
FIGS. 3A (front view) and 3B (side view) show a first embodiment of a rotary 1-Stroke DDMotion engine. The same principles as introduced in FIGS. 1 and 2 are followed in rotary embodiment FIGS. 3A and 3B. A central shaft 310 reciprocates as Piston #1 and Piston #2 move within chambers A, B, C and D with assigned functions in the different combinations of FIGS. 4-7 between Partition #1 and Partition #2 of a CYLINDRICAL HOUSING which may be integral with (FIG. 3B) the partitions or connected to the partitions (FIG. 3A). Leads are shown for example for intake, exhaust, ignition of spark plugs which may be located on PARTITION sides and valves for each chamber A, B, C and D are not shown.
Figure 8:
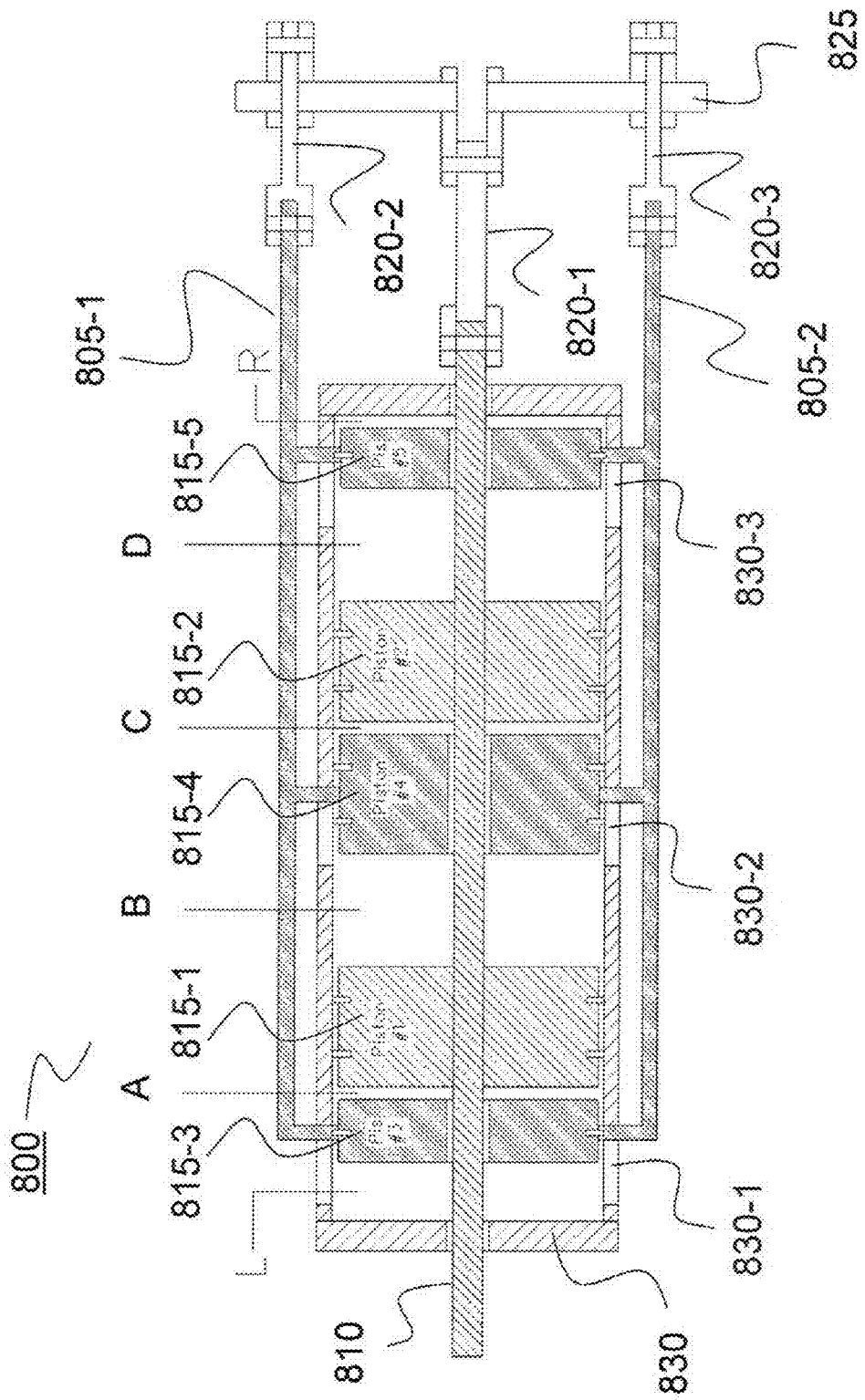
FIG. 8 shows a five piston, opposed piston, opposed cylinder (OPOC) 1-Stroke DDMotion embodiment in detail including its connection to a crankshaft via a central shaft wherein pistons #3, #4 and #5 are attached together by one or first and second side rods and pistons #1 and #2 are attached to the common central shaft for reciprocating motion and driving a connected crankshaft and wherein there are four dedicated chambers A, B, C and D (L for Left space and R for Right space) within a rectangular cross-section, housing assigned to functions as per one of FIGS. 4-7.
Figure 9:
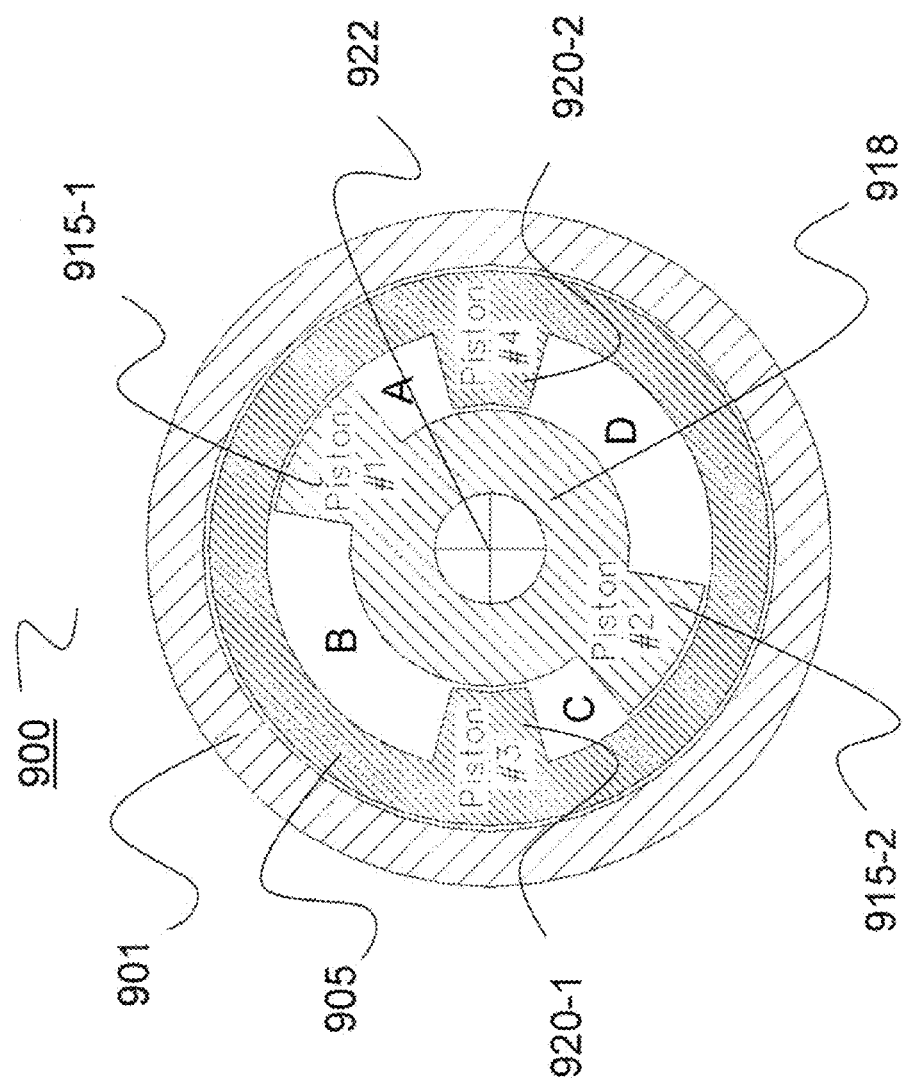
FIG. 9 shows a corresponding rotary opposed piston, opposed cylinder (OPOC) embodiment to the opposed piston, opposed cylinder straight embodiment of FIG. 8. In particular.

The present invention is directed to applications of, for example, a reciprocating straight or rotary piston in a reciprocating straight or rotary internal combustion engine, straight line embodiments having 1-stroke and opposed piston straight and rotary embodiments and various aspects and embodiments will be described with reference to FIGS. 2-17A and 17B wherein FIG. 1A through FIG. 1D provides a view of the development of a straight 1-stroke engine (FIG. 1D) from a typical 4-stroke engine (FIG. 1A); FIG. 2 shows a 1-stroke straight engine embodiment; FIGS. 3A and 3B show a typical 1-stroke rotary engine embodiment; FIGS. 4-7 show different chamber assignments to coordinated functions in straight (or rotary) embodiments of a 1-stroke engine of the present invention; FIG. 8 shows an example of an opposed piston, opposed cylinder (OPOC) 1-stroke straight engine embodiment with four assignable chambers per one of FIGS. 4-7; FIG. 9 shows a comparable opposed piston, opposed cylinder (OPOC) 1-stroke rotary engine embodiment with four assignable chambers per one of FIGS. 4-7; FIG.'S 10(A) through 10(D) show views of seal plates, C-shaped seals, piston-shaped seals usable in rotary embodiments; FIG. 11A through FIG. 11D show application of either a crankshaft machined shaft split bushing or a crankgear shaft bearing for providing a uni-directional output from a reciprocating shaft 1120 of a straight embodiment shown (or a rotary embodiment not shown); FIG. 12A in front view and FIG. 12B in side view show two rotary pistons and each movable in two chambers each between first and second partitions respectively for reciprocatingly turning shaft 1210; FIG. 13A in front view and FIG. 13B in side view show that a piston may be part of a toroid having two rounded ends and a curved body lengthwise so that round piston rings may be used as seen in the depicted; FIG. 14A in front view and FIG. 14B in side view show use of such rings and seals in principle in toroidal pistons; FIGS. 15A, 16A and 15B and 16B show in concept the combination of first and second rotary engine embodiments using a Transgear gear assembly to increase output power and FIGS. 17A and 17B show a typical spur/helical gear assembly having at least three assignable variables where first and second engine outputs may be combined to provide an increased power output.

Referring first to FIG. 1A to FIG. 1D, these figures provide a developmental guide showing how a known 4-stroke four cylinder engine may evolve into a 1-stroke straight engine having a selectable Otto cycle of coordinated functions assigned to dedicated chambers and each stroke being a power stroke. FIG. 1A to FIG. 1D provide a series of mechanical diagrams explaining a theory of how a conventional 4-stroke engine may be compared and differences indicated in a series of steps of conversion from a conventional 4-Stroke engine to a DDMotion 1-Stroke engine. In particular, referring first to FIG. 1A, there is shown a conventional 4-stroke internal combustion engine known in the art with pistons #2 and #3 lowered (chambers expanded) and #1 and #4 raised (chambers compressed). The chamber for piston #2 may be filled with air/gas mixture and chamber #3 may show the air/gas mixture having been ignited and being exhausted. Chamber #1 may have air/gas mixture compressed and ready for ignition.

Referring further to FIG. 1A, FIG. 1A shows the pistons #1, #2, #3 and #4 in line and in a chamber arrangement with pistons #1, #2, #3 or #4 are driving a crankshaft in the same direction of rotation as pistons #1, #2, #3 or #4 are alternately ignited.

FIG. 1B shows a first step in realigning the typical 4-stroke engine of FIG. 1A. One moves pistons/chambers #1 and #4 to an opposite side of an output crankshaft, showing all crankshaft cranks in a down position resulting in Pistons #1 and #4 being on the bottom of the output crankshaft and pistons #2 and #3 being on the top and changing places so the pistons are in the order #1, #3, #2, #4 in FIG. 1B. FIG. 1C shows a step of aligning piston/chamber #1 and #3 opposite one another and piston/chamber #2 and #4 opposite one another so that two crankshafts are eliminated and pistons #1 and #3 are joined together and also pistons #2 and #4 are joined together since they are moving to the same directions). FIG. 1D shows a final step of aligning chambers with pistons #1 and #3 joined together and become a double-headed piston and #2 and #4 joined together and become a double-headed piston in a straight vertical line to form an embodiment of a DDMotion 1-Stroke straight line engine.

The 4-stroke engine (FIG. 1A) requires four power strokes or four 4-stroke piston assemblies to rotate the output crankshaft continuously or to complete a full cycle. A 2-stroke engine requires two power strokes or two 2-stroke piston assemblies to rotate the output shaft continuously or to complete a full cycle. A 1-stroke engine (FIG. 1D) only requires one power stroke or one 1-stroke piston assembly in order to rotate the output shaft continuously or complete a full cycle. So the number of piston assemblies required to complete a full cycle is one significant difference between the present engine and a conventional engine. The power stroke per engine is the same 180° power stroke. The number of piston assemblies may decrease from conventional 4-stroke to 2-stroke to an embodiment of a 1-stroke engine of the present invention from 4 to 2 to 1 as does the number of crankshafts.

The currently used 4-stroke piston engine typically has four or more pistons and up to approximately five hundred parts. The 2-stroke engine may have half as many parts, and the DDMotion engine may have approximately 200 parts. As explained above, the conventional 4-stroke piston has four dedicated chambers during a piston cycle. The 1-stroke embodiment of the present invention also has four dedicated chambers (as will be discussed with reference to FIGS. 4-7), but the 2-stroke engine has one dedicated chamber. The 4-stroke engine has high fuel efficiency as does the 1-stroke embodiment of the present invention while a conventional 2-stroke engine has low fuel efficiency. The 4-stroke and 1-Stroke DDMotion engine have low emissions while the 2-stroke engine has a comparably high degree of emissions. The specific power ratio of a currently used 4-stroke engine is 1.0 because this engine is selected as a reference. The conventional 2-stroke engine and DDMotion 1-Stroke engine have specific power ratios of approximately 1.5 and greater than 1.5 respectively. The conventional 4-stroke engine is typically used to power vehicles such as automobiles (cars). The currently used 2-stroke engine is used in small engines and power vehicles. The 1-Stroke DDMotion engine may be used in cars, as small engines and in power vehicles, even to power tractors and ships with multiple propellers.

An embodiment of the present coordinated 1-stroke internal combustion engine invention is shown in FIGS. 2 and 3A (front view), 3B (side view) and will be described herein in two forms, a straight line (FIG. 2) and a rotary (FIGS. 3A and 3B). The straight-line, by definition, has at least two pistons in order to form a straight line. The rotary version may have at least two pistons in order to form a circular line. Otherwise, the present internal combustion engine embodiments exhibit only about two hundred parts, has four dedicated chambers and so exhibits high fuel efficiency and low emission. Its power stroke/piston may rotate the output shaft one hundred eighty degrees or move the piston in one direction in a housing. Its specific power ratio may be increased over known engines to close to 2.0, i.e. greater than 1.5. Its uses are practically unlimited: for example, vehicles (such as trucks or cars), snowmobiles, lawnmowers, motorcycles, locomotives and even to power large ships with multiple propellers.

FIG. 2 provides a mechanical diagram of a first principle of creating four dedicated chambers A, B, C and D for a 1-stroke engine. To create four dedicated chambers, a cylindrical housing may have two volumes (cavities), each having a piston, separated by a center plate, the cylindrical (cylinder) housing, having nested in each volume (cavity) a double-headed piston, to form four chambers A, B, C and D per FIG. 2. Piston #1 divides a first volume (cavity) into chamber A (shown compressed) and chamber B shown expanded. Piston #2 divides a second volume (cavity) into chamber C (shown compressed) and chamber D (shown expanded).

Referring again to FIG. 2, FIG. 2 shows a second principle of 1-stroke engine development whereby chambers A, B, C and D are actuated simultaneously. A double-headed piston #1 having been added to the first volume and a double headed-piston #2 having been added to the second volume, these pistons are tied together by a central common shaft which may be attached to or integral with the pistons and provide reciprocating motion which, in turn, can turn a transverse shaft in the same rotational direction. In FIG. 2, it may now be seen that by adding pistons #1 and #2, the two original volumes are further divided by the two pistons to form four chambers A, B, C and D which pistons are actuated simultaneously by the common central shaft. The chambers A, B, C and D may be dedicated to coordinated functions as described in accordance with the third principle of development described in FIGS. 4-7.

This dedication of chambers to functions occurs by joining the first and second double-headed pistons by fixed means such as the common central shaft, still leaving chambers A, B, C and D (A and C compressed and B and D expanded but not yet dedicated to functions). The central common shaft may extend to the left, to the right or both to the left and to the right sides and so each side of the central common shaft may be used to provide reciprocating motion toward an output. In an alternative embodiment to be discussed herein, the central, common shaft may be replaced or supplemented by external to the housing rods first shown in FIG. 8 of an opposed piston, opposed cylinder having both a central common shaft and at least one external rod connecting particular, alternate pistons. Similarly, these external rods may extend to the left, to the right or both to the left and to the right. Pistons #1 and #2 move from left to right in reciprocating motion along with the central common shaft. An ignition in any chamber will actuate both pistons to move in the engine of FIG. 2. Four functions (intake, exhaust, ignition and compression) are simultaneously performed per one stroke (movement to the left or movement to the right, for example).

FIG. 2 also provides a mechanical diagram of the second principle, to actuate the four chambers A, B, C and D simultaneously, for example, by tying the two double-beaded pistons together via the central common shaft (or external rods, not shown in FIG. 2). An ignition in any of the chambers A, B, C or D actuates both pistons to move either to the left or to the right, simultaneously, where the four chambers A, B, C and D are capable of performing four functions per each stroke (from the left to the right, for example).

Figure 4:
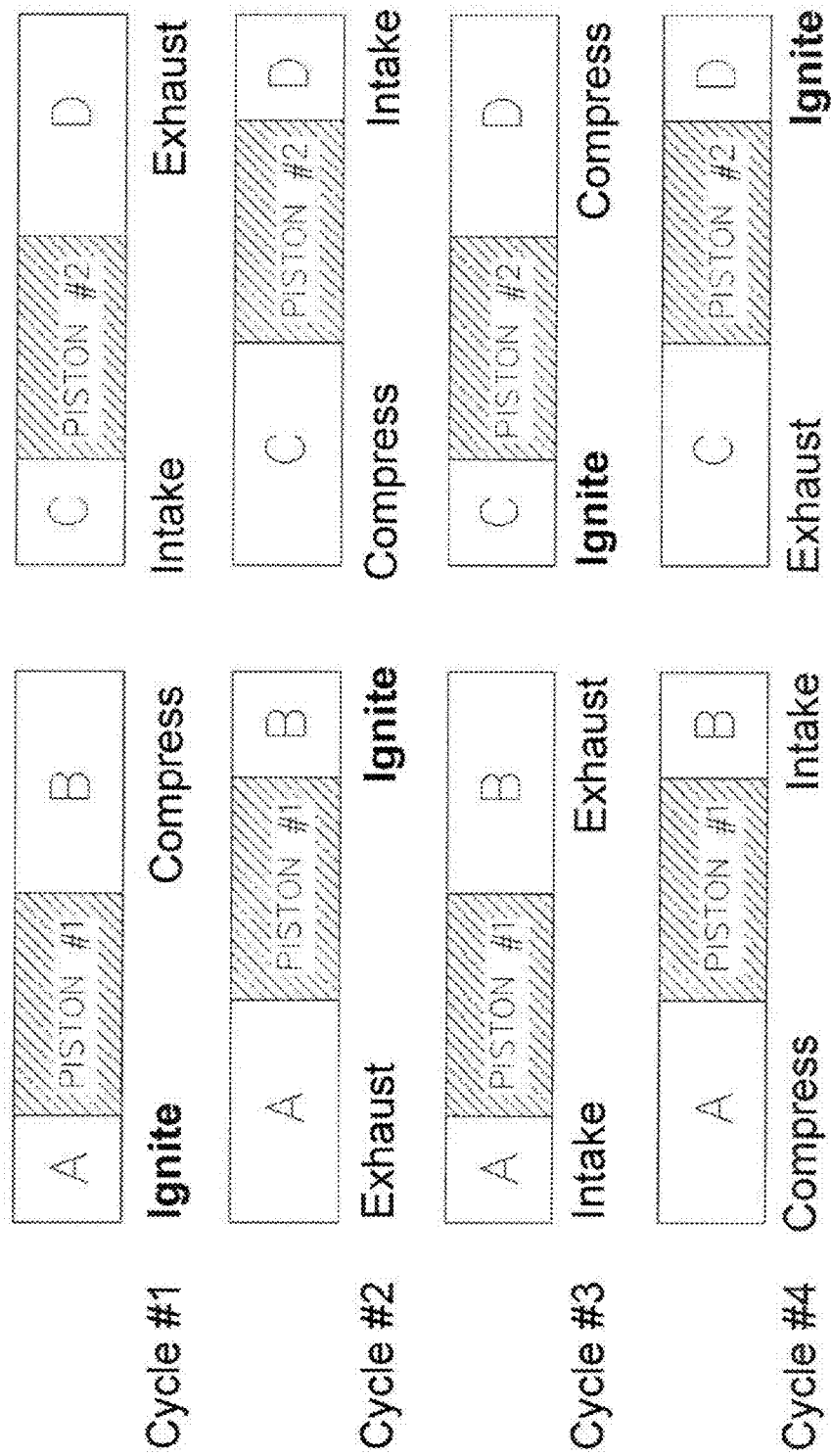
FIGS. 4-7 show different combinations of assignment of coordinated functions, Ignite, Compress, Intake and Exhaust to each dedicated chambers. While a linear embodiment is shown, a rotary embodiment may follow a similarly assigned combination of functions to chambers.

FIGS. 4-7 provide mechanical diagrams of the third principle, to assign coordinated functions to the four chambers, for example, Cycle #1 of FIG. 4, chamber A may be ignite, chamber B may be compress, chamber C may be intake and chamber D may be exhaust in a given stroke of a cycle and have a coordinated cycle to move the shaft and pistons of FIG. 2 or 3A and 3B in a reciprocating motion, and in such a coordinated cycle, wherein "intake" means filling the dedicated chamber A with fuel/air mixture while the chamber A is expanding, "exhaust" means chamber B discharges burned fuel as compression of the piston occurs, "ignition" means a spark plug is igniting compressed fuel and air mixture in chamber C and "compression" means compression of the filled fuel and air mixture in chamber D. The pistons are shown moved to the left in FIG. 2 and are located along a horizontal diameter in FIG. 3B (a central position with respect to the first and second volumes forming chambers A, B, C and D. But on starting an engine, the pistons can be found in any position between and including a left-most and a right-most position. So if ignition occurs of a fuel/air mixture in chamber C, wherever the two pistons are, (except if they are in a right-most position) they will be encouraged because of the ignition of the fuel-air mixture to move together to the right. An alternate assignment of coordinated functions to chambers may be that chamber A may be ignition, chamber B may be exhaust, chamber C may be intake and chamber D may be compression per cycle #1 of FIG. 6.

After an ignition function in chamber A in Cycle #1 (a first stroke) as shown in FIG. 4, ignition in Cycle #2 (a second stroke) now occurs in chamber B at the same time as compression is assigned to chamber C, intake is assigned to chamber D and exhaust is assigned to chamber A. To complete a conventional Otto cycle in four strokes, whereby a cycle of four strokes is repeated, see changes in chamber A in cycles #1, #2, #3, and #4. The first stroke moves the two joined double-headed, pistons of FIG. 2 to the right; the second to the left and so on. Continuing the discussion, in Cycle #3 (the third piston stroke), intake occurs in chamber A, exhaust in chamber B, ignite in chamber C and compress in chamber D. Finally, In Cycle #4 (the fourth and final stroke) of an Otto cycle, compress occurs in chamber A, intake in chamber B, exhaust in chamber C and intake in chamber D. The Otto cycle of four piston strokes repeats independently within a chamber when a coordinated functions are assigned to dedicated chambers.

FIG. 2 shows a first embodiment of a straight/linear 1-Stroke DDMotion piston assembly with four dedicated chambers A, B, C and D and two double-headed pistons, piston #1 and piston #2 joined by a common central shaft. FIG. 2 shows the cylindrical housing with end plates and a central plate separates the housing into two volumes (cavities). Similar reference numbers will be used herein wherein the first digits of the reference number denote where an element first appears, for example, shaft 310 of rotary 1-stroke engine 300 first appears in FIGS. 3A and 3B.

Referring now to FIG. 3A front view and FIG. 3B side view, there is shown an embodiment of a 1-stroke rotary piston engine with two pistons, two partitions, and four dedicated chambers in circular cross-section housing 300. Housing 300 has first and second partitions 325-1 and 325-2 which limit the reciprocating movement of piston #1 and piston #2 either connected to or integral with a circular cross-section 318 surrounding central, common reciprocating output shaft 310. The engine shows four dedicated chambers A, B, C and D where A and C are compressed when B and D are expanded and vice versa. Each chamber A, B, C and D follows the dedicated function to chamber of an Otto cycle selected from one in FIGS. 4-7. Piston #1 and Piston #2 may reciprocate between partitions 325-1 and 325-2. One stroke of pistons #1 and #2 comprises one of a clockwise movement from stop to speed to stop when reaching almost to a respective partition. Another stroke may be a counter-clockwise movement of pistons #1 and #2 together, analogous to the straight line 1-stroke embodiment. Intake, exhaust valves and spark plugs may be installed in the partitions 325-1 and 325-2 or to the cylinder housing 300. Unlabeled leads are shown in FIGS. 3A and 3B to represent leads to intake, exhaust, spark plugs.

FIGS. 4-7 represent four representative assignments of functions, Ignite, Compress, Intake and Exhaust to four chambers A, B, C and D where Piston #1 is between chambers A and B and Piston #2 in between chambers C and D. The "ignition" function initiates a power stroke in each cycle of each of FIGS. 4-7. So each cycle is a power stroke because each cycle has an Ignite function allocated one of chambers A, B, C and D.

FIGS. 4-7 show different combinations of assignment of coordinated functions, Ignite, Compress, Intake and Exhaust to chambers. While a linear embodiment is shown, a rotary embodiment may follow a similarly assigned combination of functions to chambers. FIG. 4 shows, in Cycle #1, chamber A is assigned Ignite while chamber 8 is assigned Compress. Chamber C is assigned Intake and chamber D is assigned Exhaust. Pistons #1 and #2 have moved to the left. In a rotary embodiment, the pistons have moved, for example, in a counter-clockwise direction. In Cycle #2, chamber A is assigned Exhaust while chamber B is assigned Ignite. Chamber C is assigned Compress while chamber D is assigned Intake. Pistons #1 and #2 have moved to the right. In a rotary embodiment, the pistons have moved, for example, in a clockwise direction. In Cycle #3, chamber A is assigned Intake while Chamber B is assigned Exhaust. Chamber C is assigned Ignite while Chamber D is assigned Compress. In cycle #4, chamber A is assigned Compress while chamber B is assigned intake. Chamber C is assigned Exhaust while Chamber D is assigned Ignite.

Figure 5:
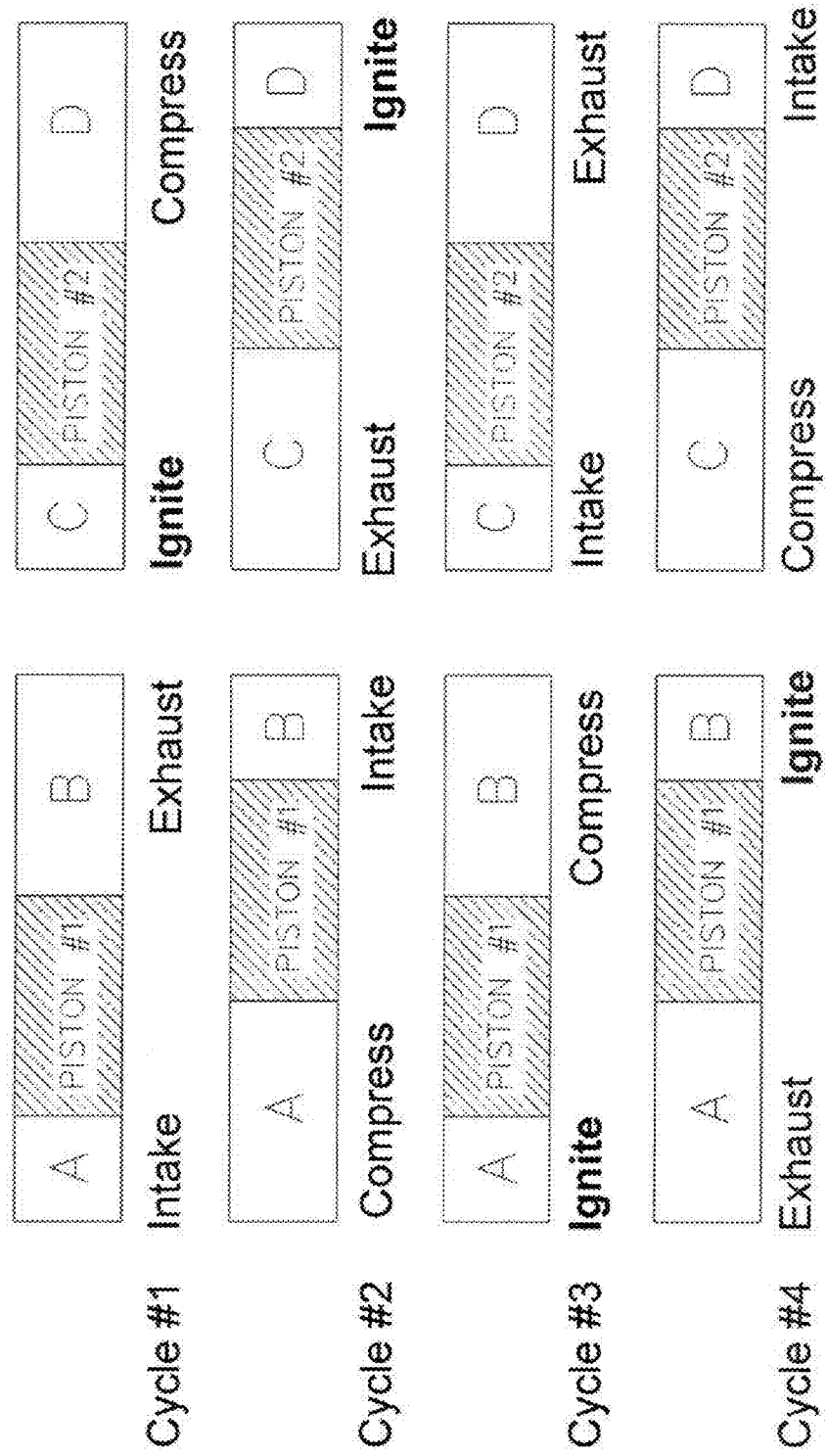

FIG. 5 shows a further combination of assignment of coordinated functions to chambers where pistons #1 and #2 and their respective housings have reversed positions in a straight 1-stroke engine. Only referring to Cycle #1, by way of example. Pistons #2 and #1 have moved to the left. Chamber A is assigned Intake while chamber B is assigned Exhaust, Chamber C is assigned Ignite while chamber D is assigned Compress.

Figure 6:
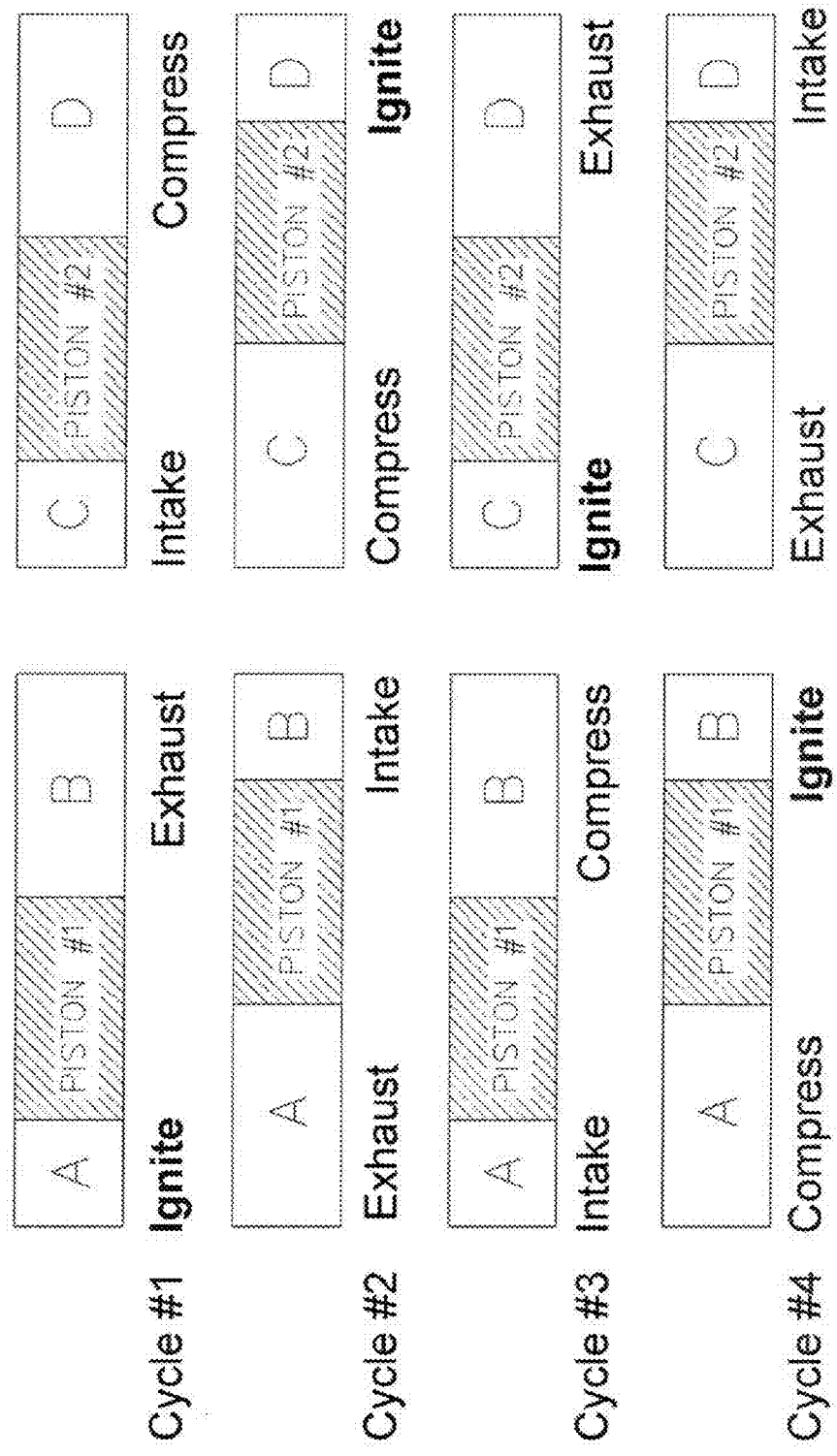

FIG. 6 shows a further combination of assignment of coordinated functions to chambers where, as in FIG. 4, pistons #1 and #2 and their respective housings have the same positions in a straight 1-stroke engine. Only referring to Cycle #1, by way of example, Pistons #1 and #2 have moved to the left. Chamber A is assigned Ignite while chamber B is assigned Exhaust. Chamber C is assigned Intake while chamber D is assigned Compress.

Figure 7:
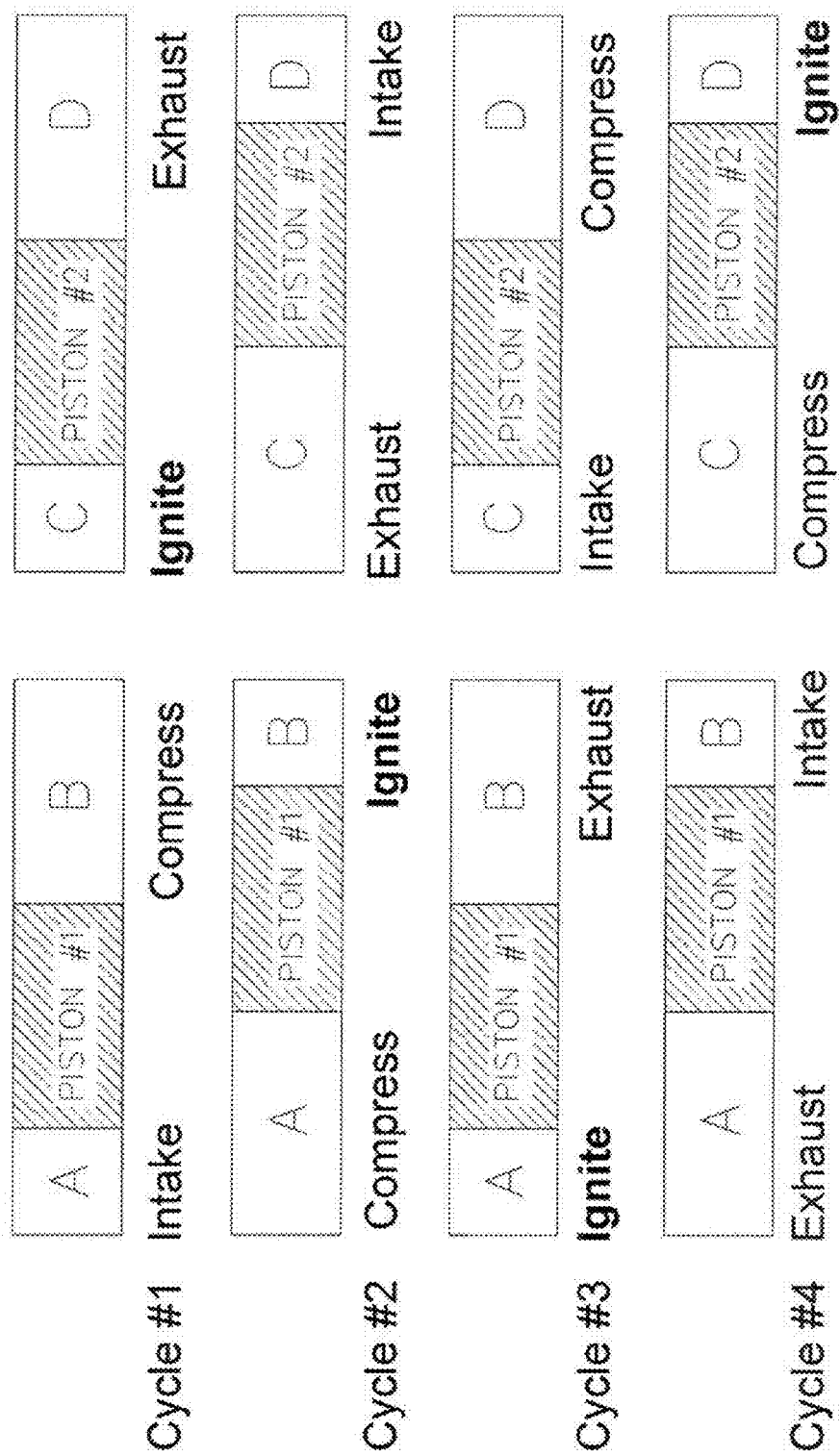

FIG. 7 shows a further combination of assignment of coordinated functions to chambers. Only referring to Cycle #1, by way of example, Pistons #1 and #2 have moved to the left. Chamber A is assigned intake while chamber B is assigned Compress, Chamber C is assigned Ignite while chamber D is assigned Exhaust.

FIGS. 8 and 9 show straight and rotary embodiments respectively of an opposed piston opposed cylinder (OPOC) engine having coordinated functions to chambers A, B, C and D per a selection of Otto cycles per FIGS. 4-7.

Referring now to FIG. 8, there is shown a straight line or linear OPOC engine example having four chambers A, B, C and D. A cylinder housing 830 is shown having end plates in which a central shaft 810 may extend from either or both ends. In this case central shaft 810 joins a central crank 820-1 for turning crankshaft 825. The cylinder housing may have one or two sets of three apertures, 830-1, 830-2 and 830-3, for allowing one or two external connecting rods 805-1, 805-2 to connect via external side cranks 820-2, 820-3 to crankshaft 825 for rotational movement in one rotational direction responsive to reciprocating piston movement.

The embodiment of FIG. 8 of a five piston straight OPOC 1-stroke piston wherein three cranks drive an output shaft shows three connections 820-1, 820-2 and 820-3 to the output shaft 825 shown. FIG. 8 shows a five piston OPOC 1-stroke DDMotion embodiment in detail having a central shaft 810 connection 820-1 to an output shaft 825 via the central shaft 810 and also by each of two external rods 805-1, 805-2 wherein pistons #3, #4 and #5 (#3 and #5 are single-headed pistons and #4 is a double-headed piston) are attached together by side rods 805-1 and 805-2 which move in apertures 830-1 to 830-3. Pistons #1 and #2 (#1 and #2 are double-headed pistons), on the other hand, are attached to the common central shaft 810. Central common shaft 810 is firmly connected to or integral with double-headed piston #1 and piston #2. At least pistons #3, #4, and #5 may be lubricated or have roller bearing apertures machined into them to make them slide over the shaft 810 with ease. There are four dedicated chambers A, B, C and D (A and C being compressed). There are also shown chambers L (for left) and R (for right) which are not active in the sense but the end plates may be embedded with bearings. When pistons 815-3, 815-4 and 815-5 are fixed by rods 805-1 and 805-2 together, the connecting rods 820-1 reciprocate left and 820-2 and 820-3 move right causing central, common shaft 810 and rods 805-1 and 805-2 to turn an output shaft 825 connected by connecting rods 820-1, 820-2 and 820-3. The chambers may follow the cycles of FIGS. 4-7 where coordinated functions are dedicated to chambers.

FIG. 9 shows a corresponding rotary opposed piston, opposed cylinder (OPOC) embodiment to the opposed piston, opposed cylinder straight embodiment of FIG. 8. In particular, FIG. 9 shows a mechanical diagram of an embodiment of a DDMotion rotary piston opposed piston, opposed cylinder (OPOC) engine having a DDMotion 1-Stroke piston wherein the embodiment comprises four pistons, pistons #3 and #4 being integral with or attached to an internal cylindrical housing of an external cylindrical housing and pistons #1 and #2 are joined by a cylindrical center portion and central crankshaft forming four dedicated chambers A, B, C and D. Chambers A, B, C and D may be assigned functions as introduced by FIGS. 4-7 and wherein conventional intake, exhaust, valves, and spark plugs may be installed to end plates (not shown) of the external cylindrical housing (not shown).

Referring now to FIG. 9 in greater detail, FIG. 9 shows a mechanical diagram of an embodiment of a DDMotion rotary piston opposed piston, opposed cylinder (OPOC) engine 900. The engine is contained in an external cylinder housing 901 having a circular cross-section. Inside external circular housing 901 is an internal housing having a circular cross-section portion 905. This housing portion 905 has connected to it or integral with it piston #3, 920-1, and piston #4, 920-2. These are similar to the partitions of the engine of FIG. 3B except, because of the internal/external housing construction, piston #3, 920-1, and piston #4, 920-2, are able to reciprocate in opposite direction from internal piston #1, 915-1 and piston #2, 915-2. Piston 915-1 and piston 915-2 are connected to or integral with a central reciprocating shaft 922 and share a circular cross section portion 918 which joins Piston #1 and Piston #2 together and which in turn has, at its center, a central reciprocating shaft 922 for output. Four dedicated chambers are formed by the four pistons: chambers A and C are shown compressed while chambers B and D are shown expanded. As discussed above, chambers A and C may be fully expanded when chambers B and D are fully compressed and vice versa and in any position in between during an Otto cycle per one of FIGS. 4-7. The embodiment comprises four pistons, pistons #3 and #4 being integral with or attached to the internal cylindrical housing 905 of the external cylindrical housing 901. Pistons #1 and #2 are joined by the cylindrical center portion 918 and central crankshaft 922 forming the four dedicated chambers A, B, C and D. Conventional intake, exhaust, valves, and spark plugs may be installed to end plates (not shown) of the external cylindrical housing 901. Similarly to the straight OPOC engine of FIG. 8, internal pistons #3 and #4 may be connected, to rods not shown for joining to an output shaft and the central shaft 922 may provide a contrary output so that a reciprocating movement occurs between internal housing 905 and shaft 922. External housing 901 may remain stationary in one embodiment with the internal members perforating the reciprocating clockwise/counterclockwise movement. The rotary OPOC engine follows an Otto cycle, coordinated functions to chambers as explained above with reference to FIGS. 4-7.

FIG. 10A, FIG. 10B, FIG. 10C and FIG. 10D show exemplary embodiments for rotary piston rings and seals wherein FIG. 10A in top view shows a rotary 1-stroke double piston embodiment with seal plates along a diameter and a C-shaped seal and a piston-shaped seal installed along a perpendicular diameter in a rotary 1-stroke engine of the present invention; FIG. 10B in side view shows details of the C-shaped seal of the rotary engine of FIG. 10A; FIG. 10C in side view shows details of a plate seal of FIG. 10A; and FIG. 10D in side view shows in perspective view details of a piston-shaped seal of the rotary engine of FIG. 10A for installation on an internal diameter. More particularly, FIG. 10A, FIG. 10B and FIG. 10C show exemplary embodiments for rotary piston seals wherein FIG. 10A shows a rotary 1-stroke piston embodiment with seal plates along a horizontal diameter, a piston-shaped seal at the bottom and a C-shaped seal at the top installed in a rotary 1-stroke engine of the present invention. FIG. 10B in side view shows details of the C-shaped seal of the rotary engine of FIG. 10A, FIG. 10C in side view shows details of a plate seal of the rotary engine of FIG. 10A. FIG. 10D in side view shows a typical piston-shaped seal of FIG. 10A. FIG. 10B, FIG. 10C and FIG. 10D show alternative embodiments of seals and seal plates and provide three views including an overview of alternative rotary piston seals. FIG. 12B shows a piston at top dead center which may have a C-shaped seal or seal plate (replacing a partition). Seal plates may seal a diameter of the cylindrical housing. Also seen in FIG. 10A are seal plates that may be on either side of a piston paddle of the lower portion of the piston. FIG. 10B shows an embodiment of a C-shaped seal of FIG. 10A, and FIG. 10C provides a view of a seal plate of FIG. 10A.

FIG. 11A through FIG. 11D show alternate means of coupling a 1-stroke, central common shaft, two double-headed cylinder embodiment of the present invention, wherein FIG. 11A and FIG. 11B show a front view and an overhead view of a crankshaft machined shaft split bushing embodiment respectively for coupling a 1-stroke engine to produce an output 1145-1. FIG. 11C and FIG. 11D show a front view and an overhead view of a Crankgear shaft bearing embodiment respectively for coupling a 1-stroke engine to produce an output 1145-2.

More particularly, FIG. 11A through FIG. 11D show alternate means of coupling a 1-stroke, central common shaft 1120, two double-headed cylinder embodiment of the present invention to output 1145. FIG. 11A and FIG. 11B show a front view and an overhead view of a crankshaft machined shaft split bushing embodiment respectively for coupling a 1-stroke engine having a central, common, reciprocating shall 1120 coupled to a connector and pin 1130 and connecting rod 1135 in a manner of a crankshaft machined shaft, split bushing 1140-1 to an output 1145-1 as seen in FIG. 26(C) of U.S. patent application Ser. No. 14/225,658 tiled Mar. 26, 2014 (now allowed) of Kyung Soo Han.

Furthermore, a Crankgear™ shaft bearing 1140-2 per FIG. 11C and FIG. 11D produces an output 1145-2 where FIG. 11C and FIG. 11D show a front view and an overhead view of a Crankgear shaft bearing embodiment respectively for coupling a 1-stroke engine to produce an output 1145-2. In FIG. 11C and FIG. 11D, a similar connector and pin 1130 drives in a reciprocating manner a similar shaft 1135 to a circular Crankgear shaft bearing 1140-2 having a similar central shaft 1120 for producing the output 1145-2 of FIG. 11C or 11D. While a straight 1-stroke engine embodiment is shown, the engine embodiment may likewise comprise a rotary engine embodiment used with a similar split bushing 1140-1 or Crankgear 1140-2.

FIG. 12A and FIG. 12B provide an introduction to the concept, for example, of assembling together first and second 1-stroke, single piston radially reciprocating rotary engines to form a single engine (similar to that shown in FIGS. 2 and 3A and 3B) for reciprocating motion of shall 1210, wherein FIG. 12A shows a front view of first and second rotary single piston engines side by side in a housing. Each engine forms two dedicated chambers, for example, A and B or C and D having a single piston, Piston #1 or Piston #2 and a single partition, Partition #1 or Partition #2, for forming four chambers, A, B, C and D between the two single piston rotary engines mounted within the housing for turning shaft 1210. Note that the stroke of Piston #1 and Piston #2 each comprise angles in excess of 180°, for example between 270° and 320° wherein the Piston #1 and #2, themselves, for example, each comprise preferably equal angles between 20° and 50° as seen in side view FIG. 12B. Partitions #1 and #2 are mounted back to back in FIG. 12B and shown side-by-side in FIG. 12A.

In operation, Piston #1 and Piston #2 each provide reciprocating motion of shaft 1210 and so combine power output delivered to shaft 1210. Leads for intake, exhaust, valves, and spark plugs are shown in each of FIGS. 12A and 12B to first and second, partitions, Partition #1 and #2, to chambers A, B, G and D in turn and in accordance with one of FIGS. 4-7. The rotary engine of FIG. 12A delivers greater power to output shaft 1210 because of the larger angle piston stroke than, for example, the embodiment of FIG. 3B and has Piston #1 and Piston #2 axially reciprocating and driving common shaft 1210.

FIGS. 13A and 13B show a further embodiment of two toroidal shaped pistons mounted side by side similar to the combined engine of FIGS. 12A and 12B. Front View FIG. 13A shows Piston #1 and #2 each shaped like a key hole in side view comprising a circular portion and a pie-shaped portion, the circular portion surrounding reciprocating shaft 1310. A single Partition shown lengthwise in FIG. 13A has different sets of leads for intake, exhaust, valves, sparking either side of the partition as seen better in side view FIG. 13B. As in FIGS. 12A and 12B, the piston size has approximately the same angle range and the range of motion of the piston is in an equally large range greater than 180°. The reciprocating motion of shaft 1310 may be converted to rotational movement (as can the engine of FIGS. 12A and 12B) by split hushing or Crankgear turning of an output shaft in one rotational direction per FIGS. 11A, 11B, 11C and 11D.

FIGS. 14A and 14B show alternative embodiments of the piston seals #1 and #2 and shaft 1310 surrounding circular portions of toroidal pistons for the engine of FIGS. 13A and 13B. FIGS. 14A and 14B show piston seals and rings wherein FIG. 14B in side view shows one or more piston rings 1325-1 and 1325-2. FIG. 14B in side view shows Piston seals #1 and #2 having a piston seal 1325-1, 2 extending approximately 300° around the circumference of each piston, Piston #1 and Piston #2.

FIG. 15A in front view and FIG. 15B in side view show two rotary engines side-by-side as seen in FIG. 15A comprising two assemblies as first shown in FIGS. 3A and 3B. The two engine assemblies may have different first and second shaft outputs 1510-1 and 1510-2 whose assemblies' outputs may be combined together using a Transgear gear assembly according to FIG. 17 to increase power output. Round piston rings may be used in these assemblies if the pistons are toroidal.

FIG. 16A in front view and FIG. 16B in side view show further first and second engine assemblies similar to those shown in FIGS. 12A and 12B assembled together to provide first and second outputs at shafts 1610-1 and 1610-2 that may be likewise combined by a Transgear gear assembly according to FIG. 17 to increase power output. In tins embodiment, first and second reciprocating outputs are provided at shafts 1610-1 and 1610-2 which are combined.

FIG. 17A in perspective view and FIG. 17B in side view show a typical spur/helical three variable Transgear gear assembly discussed in great detail in various embodiments but which may be used, for example, to combine first and second engine outputs, for example, as variables #1 and #2 to provide a combined, increased power output variable 3 where any of a left sun gear, right sun gear, and carrier gears comprise three assignable variables as first and second inputs and combined, increased power outputs.

Conventional means may be used for ignition and fuel ignition such as spark plugs with spark distributed in sequence. Ignition may occur in the several embodiments at any convenient point so as to ignite the compressed fuel/air mixture in the chamber to be ignited (chambers A, B, C, D of any of the above-described engines in sequence). However, in a preferred embodiment, electronics may be used to properly clock ignition/spark and the fuel intake and exhaust times and known devices such as valves and seals and the like may be accessed from outside the cylindrical housing. Also, instead of mechanical cams, solenoids may actuate opening and closing (intake and exhaust). As already suggested, known fuel injection systems may be applied. Since the intake and exhaust are dedicated at each of the four stages of a repeating cycle, the timing for opening and closing the cavities are improved when compared with a two-stroke or rotary engine and approximately the same as exhibited by a four-stroke engine, for example, with scavenging. The following table provides an example of an engine start. Any one of the chambers A, B, C and D may be ignited and find a pair of pistons of a 1-stroke engine in any position such that the position of a pair of pistons should change with an ignition of an air/fuel mixture in a table

TABLE 1

Assigned coordinated functions to a stroke if cycle #1 is the first stroke.

|  | Chamber A | Chamber B | Chamber C | Chamber D |
|---|---|---|---|---|
| Cycle #1 | Intake | Exhaust | Ignite | Compress |
| Cycle #2 |  |  |  |  |
| Cycle #3 |  |  |  |  |
| Cycle #4 |  |  |  |  |

A 1-stroke engine of the present invention may be a modified 4-stroke internal combustion engine as discussed above. Each of the functions assigned to the respective four chambers will go through Otto cycles. Table 2 shows the cycle of chamber A. (Chamber A is selected since the first function may be "intake".)

TABLE 2

Otto Cycle in Chamber A.

|  | Chamber A | Chamber B | Chamber C | Chamber D |
|---|---|---|---|---|
| Cycle #1 | Intake | Exhaust | Ignite | Compress |
| Cycle #2 | Compress |  |  |  |
| Cycle #3 | Ignite |  |  |  |
| Cycle #4 | Exhaust |  |  |  |

In Table 3 below, which provides a complete cycle, it may be seen, for example, that a given function moves from stroke to stroke on the diagonal. For example, it may be seen that INTAKE moves on the diagonal through the Chambers A, B, C and D while IGNITE moves through the chambers C, D, A and B on the diagonal. So any function assigned to a chamber in one stroke may be assigned on the diagonal to the next chamber in succession in the next stroke.

TABLE 3

One-Stroke Rotary Cycles (Cycles of All Chambers)

|  | Chamber A | Chamber B | Chamber C | Chamber D |
|---|---|---|---|---|
| Cycle #1 | Intake | Exhaust | Ignite | Compress |
| Cycle #2 | Compress | Intake | Exhaust | Ignite |
| Cycle #3 | Ignite | Compress | Intake | Exhaust |
| Cycle #4 | Exhaust | Ignite | Compress | Intake |

The purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What I claim is:

1. A rotary one-stroke internal combustion engine having a power stroke greater than 180° and less than 360°, the engine comprising:
a cylindrical housing; and
a center plate separating the cylindrical housing into a first compartment and a second compartment having a first compartment volume being equal to a second compartment volume;
wherein the first compartment is bounded by a first end plate and includes a first piston disposed within,
the first piston and a first partition cooperating to divide the first compartment into first and second chambers, the first piston being mounted on a central shaft;
wherein the first piston oscillates within the first compartment to greater than 180° and less than 360° rotatable movement, the oscillating movement of the first piston being bounded by a first partition, and
wherein the second compartment is bounded by a second end plate, and includes the second end plate having a second piston and a second partition disposed within,
wherein the second piston and the second partition cooperating to divide the second compartment into third and fourth chambers, the second piston mounted on the central shaft, the central shaft passing through the center plate separating the first from the second compartments of the cylindrical housing;

wherein the second piston oscillates within the second compartment greater than 180° and less than 360° rotatable movement, the oscillating movement of the second piston being bounded by the second partition, and wherein each of the first piston and second piston comprises a pie-shaped section of a circle in side view.

2. The rotary one-stroke internal combustion engine having a power stroke greater than 180° and less than 360° of claim 1, the first, second, third and fourth dedicated chambers being sequentially dedicated to functions of intake, compress, ignite and exhaust in a predetermined order.

3. The rotary one-stroke internal combustion engine having a power stroke greater than 180° and less than 360° of claim 1, the first and second pistons having a partially toroidal shape in front view and first and second different sets of leads for each of the first and second compartments.

4. The rotary one-stroke internal combustion engine having a power stroke greater than 180° and less than 360° of claim 1 further comprising an external cam shaft coupled to the central shaft of the rotary one-stroke internal combustion engine.

5. The rotary one-stroke internal combustion engine having a power stroke greater than 180° and less than 360° of claim 1 wherein the first and second partitions are integral with an internal surface of the cylindrical housing and separated by the center plate.

6. The rotary one-stroke internal combustion engine having a power stroke greater than 180° and less than 360° of claim 5 wherein the first and second partitions are opposite to one another on either side of the center plate.

7. The rotary one-stroke internal combustion engine having a power stroke greater than 180° and less than 360° of claim 5, wherein the first and second partitions are adjacent to one another separated by the center plate, and positioned opposite to each other, and wherein each of the first and second partitions has a pie shape portion and a curved portion, wherein the curved portion is connected with the internal surface of the cylindrical housing.

8. The rotary one-stroke internal combustion engine having a power stroke greater than 180° and less than 360° of claim 6, wherein the first and second partitions each have respective flat sides facing one of the flat sides of the respective first and second piston, wherein each of the respective flat sides is orthogonal to the internal surface of the cylindrical housing.

9. A rotary one-stroke internal combustion engine having a power stroke greater than 180° and less than 360°, the engine comprising:

a cylindrical housing; and a center plate separating the housing into first and second compartments of equal volume, wherein each compartment is bounded by a respective first and second end plate, wherein the first compartment includes the first end plate and a first piston for greater than 180° and less than 360° oscillating movement within the first compartment bounded by a first partition, wherein the first piston is mounted on a central shaft, and the first piston and the first partition cooperate to divide the first compartment into two chambers, wherein the second compartment includes the second end plate and a second piston for greater than 180° and less than 360° oscillating movement within the second compartment bounded by a second partition, wherein the second piston is mounted on the central shaft, and the second piston and the second partition cooperate to divide the second compartment into two chambers, wherein the first and second partitions are each integral with an internal surface of the cylindrical housing and the first and second partitions are each adjacent to one another and opposite to one another in the respective first and second compartments and each disposed lengthwise within the cylindrical housing, wherein the first and second partitions each has a pie shape with respective flat sides facing one of the first and second pistons, and the flat sides are each orthogonal to the internal sides of the cylindrical housing, and wherein the central shaft for reciprocating movement with the first and second pistons is positioned lengthwise at the center of the cylindrical housing.

* * * * *